(12) United States Patent
Pendergrass et al.

(10) Patent No.: US 6,937,639 B2
(45) Date of Patent: Aug. 30, 2005

(54) SYSTEM AND METHOD FOR POSITIONING PULSES IN TIME USING A CODE THAT PROVIDES SPECTRAL SHAPING

(75) Inventors: Marcus H. Pendergrass, Huntsville, AL (US); Mark D. Roberts, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 850 days.

(21) Appl. No.: 09/835,184

(22) Filed: Apr. 16, 2001

(65) Prior Publication Data

US 2002/0191690 A1 Dec. 19, 2002

(51) Int. Cl.[7] .............................................. H04L 27/30
(52) U.S. Cl. ...................... 375/135; 375/138; 375/149; 375/239; 375/256; 342/18; 342/44; 342/386
(58) Field of Search ................................. 375/130, 132, 375/133, 135, 136, 138, 140–143, 146–148, 150, 152, 239, 244, 256; 327/336, 337; 442/17, 18, 21, 44, 57, 189, 378, 386, 413

(56) References Cited

U.S. PATENT DOCUMENTS

| | | | |
|---|---|---|---|
| 3,728,632 A | | 4/1973 | Ross |
| 5,523,758 A | * | 6/1996 | Harmuth ...................... 342/22 |
| 5,610,907 A | * | 3/1997 | Barrett ........................ 370/342 |
| 5,655,039 A | | 8/1997 | Evans |
| 5,737,460 A | | 4/1998 | Damen et al. |
| 5,748,891 A | | 5/1998 | Fleming et al. ............. 375/200 |
| 6,002,708 A | | 12/1999 | Fleming et al. ............. 375/200 |
| 6,026,125 A | | 2/2000 | Larrick, Jr. et al. |
| 6,381,391 B1 | | 4/2002 | Islam et al. |

OTHER PUBLICATIONS

"ET Docket 98–153, In the Matter of Revision of Part 15 of the Commissions' Rules Regarding Ultra–Wideband Transmission Systems—Comment on Notice of Proposed Rulemaking FCC 00–163 adopted: May 10, 2000", Addressed to: the Commission, regarding comments of: Aether Wire & Location, Inc.

* cited by examiner

Primary Examiner—Dac V. Ha
(74) Attorney, Agent, or Firm—Venable LLP; Robert Babayi

(57) ABSTRACT

A system, method and computer program product for positioning pulses, including positioning pulses within a specified time layout according to one or more codes to produce a pulse train having one or more predefined spectral characteristics where a difference in time position between adjacent pulses positioned to produce a spectral characteristic differs from another difference in time position between other adjacent pulses positioned to produce the spectral characteristic. The present invention may include shaping a code spectrum according to a spectral template in order to preserve a pre-defined code characteristic. A pre-defined code characteristic can include desirable correlation, or spectral properties. A transmitter incorporating the present invention can avoid transmitting at a particular frequency. Similarly, a receiver can avoid interference with a signal transmitting at a particular frequency. A radar system, can avoid a radar jammer attempting to jam a particular frequency.

44 Claims, 18 Drawing Sheets

Nested Combination Codes

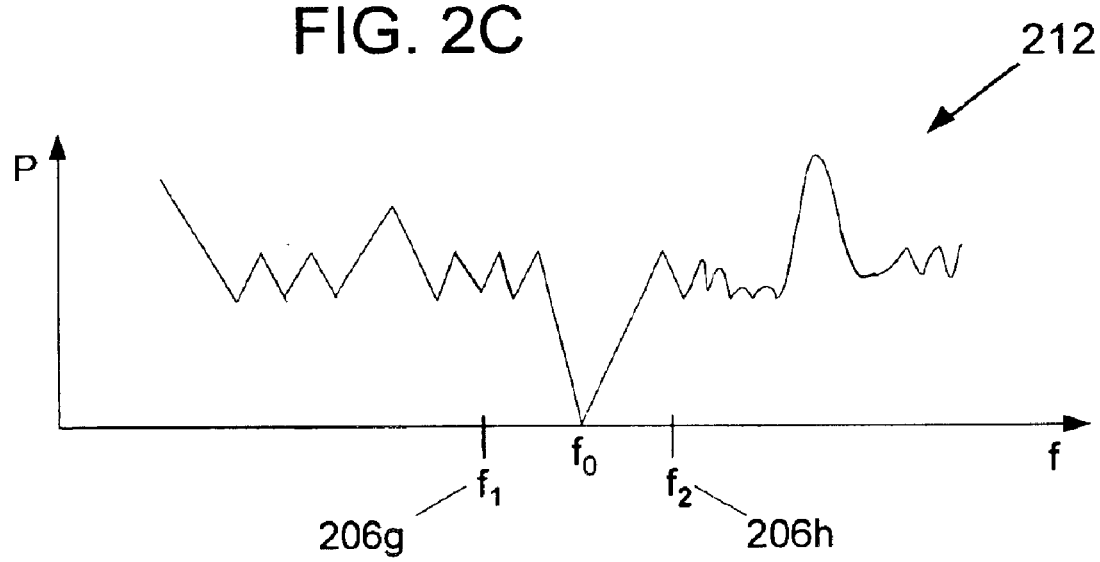

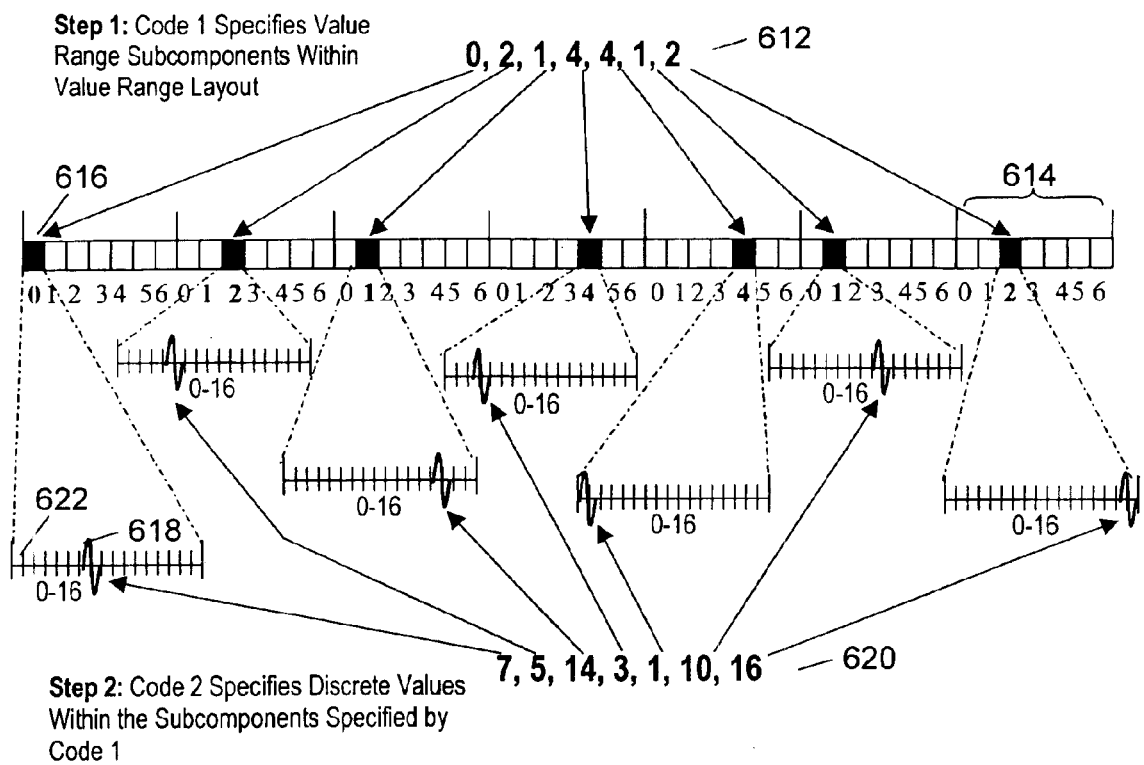
FIGURE 6C. Nested Combination Codes

SYSTEM AND METHOD FOR POSITIONING PULSES IN TIME USING A CODE THAT PROVIDES SPECTRAL SHAPING

CROSS-REFERENCE TO OTHER APPLICATIONS

The following applications of common assignee may contain common disclosure with the present application:

U.S. patent application Ser. No. 09/638,192 entitled "A METHOD FOR SPECIFYING NON-TEMPORAL PULSE CHARACTERISTICS," filed Aug. 15, 2000 as a continuation-in-part application of pending U.S. patent application Ser. No. 09/592,250.

U.S. patent application Ser. No. 09/638,046 entitled "A METHOD AND APPARATUS FOR APPLYING CODES HAVE PREDEFINED PROPERTIES," filed Aug. 15, 2000 as a continuation-in-part application of pending U.S. patent application Ser. No. 09/591,690.

U.S. patent application Ser. No. 09/637,878 entitled "A METHOD AND APPARATUS FOR POSITIONING PULSES USING A LAYOUT HAVING NON-ALLOWABLE REGIONS," filed Aug. 15, 2000 as a continuation-in-part application of pending U.S. patent application Ser. No. 09/592,248.

U.S. patent application Ser. No. 09/638,150 entitled "A METHOD AND APPARATUS FOR POSITIONING PULSES IN TIME," filed Aug. 15, 2000 as a continuation-in-part application of pending U.S. patent application Ser. No. 09/592,249.

U.S. patent application Ser. No. 09/638,151 entitled "A METHOD AND APPARATUS FOR MAPPING PULSES TO A NON-FIXED LAYOUT," filed Aug. 15, 2000 as a continuation-in-part application of pending U.S. patent application Ser. No. 09/591,691.

U.S. patent application Ser. No. 09/638,152 entitled "A METHOD AND APPARATUS FOR SPECIFYING PULSE CHARACTERISTICS USING CODE THAT SATISFIES PREDEFINED CRITERIA," filed Aug. 15, 2000 as a continuation-in-part application of pending U.S. patent application Ser. No. 09/592,288.

U.S. patent application Ser. No. 09/638,153 entitled "A METHOD FOR SPECIFYING PULSE CHARACTERISTICS USING CODES," filed Aug. 15, 2000 as a continuation-in-part application of pending U.S. patent application Ser. No. 09/592,290.

U.S. patent application Ser. No. 09/638,154 entitled "A METHOD FOR SPECIFYING NON-ALLOWABLE PULSE CHARACTERISTICS," filed Aug. 15, 2000 as a continuation-in-part application of pending U.S. patent application Ser. No. 09/592,289.

U.S. patent application Ser. No. 09/708,025 entitled "A METHOD AND APPARATUS FOR GENERA TING A PULSE TRAIN WITH SPECIFIABLE SPECTRAL RESPONSE CHARACTERISTICS," filed Nov. 8, 2000.

The above-listed applications are incorporated herein by reference in their entireties.

BACKGROUND OF THE INVENTION

1. Field of the Invention

The present invention relates generally to ultra-wide band impulse transmission systems and more particularly to applying time-hopping codes (THC) to ultra-wide band impulse transmission systems.

2. Related Art

For numerous reasons both technological and regulatory including, e.g., interference rejection and suppression, it is desirable that transmitters such as, e.g., Ultra Wideband (UWB) transmitters, be able to modify the spectral properties of the pulse trains they emit through the use of time-hopping codes (THC) to achieve a desirable spectral response.

As the availability of communication bandwidth in the increasingly crowded frequency spectrum is becoming a scarce and valuable commodity, UWB technology provides an excellent alternative for offering significant communication bandwidth, particularly, for various wireless communications applications. Because UWB communication systems are based on communicating extremely short-duration pulses (e.g., pico-seconds in duration), such systems are also known as impulse radio systems. Impulse radio systems were described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference in their entireties.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled SPREAD-SPECTRUM MULTIPLE ACCESS COMMUNICATION SYSTEM USING SATELLITE OR TERRESTRIAL REPEATERS by Gilhousen et al.

Unlike direct sequence spread-spectrum systems, the time-hopping code for impulse radio communications is not necessary for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communications channel, each state of a multi-state information signal may vary a relative pulse position by a predefined time shift such that a modulated, coded timing signal is generated including a train of pulses, each with timing corresponding to the combination of the time position coding and the multi-state modulation. Alternatively, or additionally, other modulation techniques may be employed.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about -50 pico-seconds. For a "1" binary state, the pulse may be offset from the nominal position by about +50 pico-seconds. Conventional coders that generate the time-hopping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

McCorkle in U.S. Pat. No. 5,847,677 discloses a random number generator for generating a pseudo-random code for use with jittered pulse repetition interval radar systems. The code is generated by a random number generator that possesses certain attributes desirable for a jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and sub-frames. As disclosed, a super-frame corresponds to a time interval of about 1 millisecond, representing one repetition of a code pattern, where as a frame is defined as a time interval of about 1 microsecond divided according to a code length. A sub-frame corresponds to a short time interval of about 1 nano second during which a pulse is time positioned.

It is desirable that systems, methods, computer program products and apparatuses be provided that could prevent a radio transceiver from interfering with or being interfered with by narrow band systems.

Regarding transmitters, it is desirable to prevent interfering with other transmitted signals in a particular frequency band, such as, e.g., frequencies in which, e.g., air traffic control systems, global positioning system (GPS), or medical equipment communicate.

Regarding receivers, if a device is emitting a signal, broadcasting on a particular frequency band near a receiver, such as, e.g., a cell phone at 2.4 MHz, it would be desirable to avoid having the receiver be interfered by the signal. For example, it might be desirable to notch out a frequency between the 1 MHz and 3 MHz frequency band to avoid interference. Similarly, in the case of Personal Communication System (PCS) phone systems which communicate at the 1.8 to 1.9 MHz frequencies, it could be desirable to provide a notch in the spectrum at the 1.8 to 1.9 MHz frequency band.

It is also desirable, in the case of radar systems, to provide transceivers that avoid frequency bands of a jamming radar system. For example, where a jammer attempts to interfere with a radio, it is desirable to selectively notch out the interfering jamming radar signal.

U.S. Pat. No. 6,002,708 ('708) to "Spread Spectrum Localizers," to Fleming et al., filed May 23, 1997, and U.S. Pat. No. 5,748,891 ('891) to "Spread Spectrum Localizers," to Fleming et al., filed Jul. 22, 1994, the contents of which are incorporated herein by reference in their entirety, disclose a localizer that uses cancellation nulling using pairs of opposite polarity pulses separated by a fixed period of time.

The '708 and '891 patents disclose localizers that use cancellation nulling of multiple pairs of adjacent opposite polarity pulses where the time difference between the opposite polarity pulses in a pair of pulses must be a fixed time period to in the time domain, for each of the pairs. The localizers of the '708 and '891 patents, require that the pulses in a pair of pulses must have opposite polarity. Also, the distances between the two opposite polarity pulses of a pulse pair must remain constant among all pairs of pulses. Thus, unfortunately, the '708 and '891 patents do not provide for a method of canceling pulses that allows for all pulses to be of the same polarity. Also, the '708 and '891 patents do not allow for non-constant time differences between pulses in a pulse pair.

Therefore, there exists a need for a system and method of selectively shaping or notching out particular frequency bands in spectra that overcomes the shortcomings of conventional solutions.

SUMMARY OF THE INVENTION

The present invention is directed to a method, system, apparatus and computer program product for producing time-hopping codes (THC) whose power spectral density (PSD) is low at a predefined frequency $f_{null}$. The time-hopping codes are referred to as notched codes, and their spectra are called notched spectra.

In an exemplary embodiment of the present invention, a method for positioning pulses in time can include (a) positioning the pulses within a specified time layout in accordance with one or more codes to produce a pulse train having a predefined spectral characteristic, where a difference in time position between adjacent pulses positioned to produce a spectral characteristic differs from another difference in time position between other adjacent pulses positioned to produce the spectral characteristic.

In one embodiment a code spectrum can be shaped in accordance with a spectral template such that a predefined code characteristic is preserved.

The predefined code characteristic can be a spectral property or a correlation property characteristic. The correlation property can include a cross-correlation property or an auto-correlation property.

The shaping can include minimizing the code spectrum in accordance with the spectral template. In one embodiment, the difference between the code spectrum and the spectral template can be minimized. In another, the difference can be a weighted difference. In yet another embodiment, the spectral template can correspond to a spectral notch defined by a notch frequency.

In one embodiment, the notch frequency can be a predefined frequency $f_{null}$ and step (b) of the method can include (1) initializing a counter i; (2) forming a random word p of length N/2 from the alphabet P; (3) ordering, for each $p_i$ in the random word p, an associated phaser $f_i$, resulting in an associated ordered phaser pair; (4) replacing letters in the random word p by the associated ordered phaser pair resulting in a word f of length N from the alphabet F; (5) calculating a time-hopping code $C_i$ of length N with a spectral notch at the frequency $f_{null}$, including calculating $T_k(i)$ where $T_k(i)$ is equal to $(1/f_{null})(f_k+n_k)$; (6) storing the time-hopping code $C_i$; (7) incrementing the counter i; and (8) determining if the counter i is greater than M, if so then ending, and if not then repeating the steps (2)–(8). The step (3) can include ordering randomly.

The one or more codes can include a hyperbolic congruential code; a quadratic congruential code; a linear congruential code; a Welch-Costas array code; a Golomb-Costas array code; a pseudorandom code; a chaotic code; or an optimal Golomb Ruler code.

Another embodiment of the invention is directed to an impulse transmission system configured to generate a spectral notch at a predefined frequency $f_{null}$. The system can include a transmitter configured to transmit a pulse train, where the transmitter is operative to position the pulses within a specified time layout in accordance with one or more codes to produce the pulse train having a predefined spectral characteristic, where a difference in time position between adjacent pulses positioned to produce a spectral characteristic differs from another difference in time position between other adjacent pulses positioned to produce the spectral characteristic.

In one embodiment the transmitter is operative to shape a code spectrum in accordance with a spectral template such that the predefined code characteristic is preserved.

In one embodiment, the transmitter can be an ultra wideband (UWB) transmitter.

Another embodiment of the invention is directed to a system having a transceiver configured to avoid interfering with a narrow band system. The system can include a transceiver configured to transmit and receive a pulse train that avoids interfering with a narrow band system, where the pulse train includes pulses that are positioned in time, where the transceiver is operative to position the pulses within a specified time layout in accordance with one or more codes to produce the pulse train having a predefined spectral characteristic, where a difference in time position between adjacent pulses positioned to produce a spectral characteristic differs from another difference in time position between other adjacent pulses positioned to produce the spectral characteristic.

In one embodiment the transceiver is operative to shape a code spectrum in accordance with a spectral template such that the predefined code characteristic is preserved.

In one embodiment, the transceiver can be an ultra wideband (UWB) transceiver.

Yet another embodiment of the invention is directed to a system having a receiver configured to reject interference from a narrow band system. The system can include a receiver configured to receive a pulse train and to reject interference from a narrow band system at a frequency $f_{null}$ corresponding to a frequency of the interference of the narrow band system to be rejected, where the receiver is operative to position the pulses within a specified time layout in accordance with one or more codes to produce the pulse train having a predefined spectral characteristic, where a difference in time position between adjacent pulses positioned to produce a spectral characteristic differs from another difference in time position between other adjacent pulses positioned to produce the spectral characteristic.

In one embodiment the receiver is operative to shape a code spectrum in accordance with a spectral template such that the predefined code characteristic is preserved.

In one embodiment, the receiver can be an ultra wideband (UWB) receiver.

Another embodiment of the invention is directed to a radar system operative to avoid interfering with a narrow band system. The system can include a radar transmitter operative to avoid transmitting at a predefined frequency $f_{null}$ corresponding to a frequency of the narrow band system to be avoided, and configured to transmit a pulse train, where the radar transmitter is operative to position the pulses within a specified time layout in accordance with one or more codes to produce the pulse train having a predefined spectral characteristic, where a difference in time position between adjacent pulses positioned to produce a spectral characteristic differs from another difference in time position between other adjacent pulses positioned to produce the spectral characteristic.

In one embodiment the radar system is operative to shape a code spectrum in accordance with a spectral template such that the predefined code characteristic is preserved.

In one embodiment the radar system is an ultra wideband (UWB) radar system.

In one embodiment, the radar system can have a predefined frequency $f_{null}$ corresponding to a personal communications systems (PCS) frequency band. In one embodiment $f_{null}$ can correspond to the 1.9 MHz frequency band.

In another exemplary embodiment, the radar system can have a predefined frequency $f_{null}$ corresponding to global positioning system (GPS) frequency band. In one embodiment $f_{null}$ can correspond to the 1575.42 or 1227.60 MHz frequency band.

In another exemplary embodiment, the radar system can have a predefined frequency $f_{null}$ corresponding to the industrial scientific medical (ISM) frequency band. In one embodiment $f_{null}$ can correspond to the 902–928 MHz, 2.4–2.483 GHz, or the 5.725–5.875 GHz frequency bands.

Another embodiment of the invention is directed to a method of generating a time-hopping code having a spectral notch at a frequency $f_{null}$. The method can include (a) defining the frequency $f_{null}$; (b) determining a code length N; and (c) calculating a time-hopping code of length N with a spectral notch at the frequency $f_{null}$.

In one embodiment, step (c) can include a step (1) calculating a set of associated ordered phasers $f_k$; and a step (2) calculating a time-hopping code $T_k$ where $T_k$ is equal to $(1/f_{null})(f_k+n_k)$, and where $n_k$ is an arbitrary integer.

Step (1) can include constructing a number of opposite phaser pairs $(f_k, f_k+1)$ where for each pair a first frequency $f_k$ is chosen randomly and a second frequency $f_k+1$ is chosen to be 180 degrees opposite the first frequency $f_k$. Step (1) can alternatively include arranging N phasers evenly around a unit circle such that the distance between adjacent phasers is $2\Pi$ radians. Alternatively, step (1) can also include (A) constructing a first subset of phaser pairs $(f_k, f_k+1)$ where for each pair a first frequency $f_k$ is chosen randomly and a second frequency $f_k+1$ is chosen to be 180 degrees opposite the first frequency $f_k$; and (B) arranging a second subset of phasers evenly around a unit circle such that the distances between any pair of adjacent phasers are all equal.

Step (2) can include choosing $n_k$ so as to satisfy a constraint. The constraint can include maintaining an average pulse repetition frequency (PRF); maintaining low cross- and/or auto-correlation values of the time-hopping code; or minimizing spectral peaking of the code spectrum.

The method can further include a step (d) using another code-generation technique. The another code-generation technique can include a code producing an ideal auto-correlation property; or a code producing an ideal cross-correlation property. The another code-generation technique can include a hyperbolic congruential code; a quadratic congruential code; a linear congruential code; a Welch-Costas array code; a Golomb-Costas array code; a pseudo-random code; a chaotic code; or an optimal Golomb Ruler code.

Another embodiment of the invention is directed to a method for positioning pulses. The method can include positioning pulses within a specified time layout according to one or more codes to produce a pulse train having one or more predefined spectral characteristics, where a difference in time position between adjacent pulses positioned to produce a spectral characteristic differs from another difference in time position between other adjacent pulses positioned to produce the spectral characteristic.

In a further embodiment of the invention, code spectrum can be shaped in accordance with a spectral template at a predefined frequency, $f_{null}$, preserving where a difference in time position between adjacent pulses positioned to produce a spectral characteristic differs from another difference in time position between other adjacent pulses positioned to produce the spectral characteristic.

In one embodiment of the present invention, the specified time layout can include a non-allowable region in which a pulse cannot be positioned.

Advantageously, a transmitter incorporating the present invention can avoid transmitting at a particular frequency band.

Also advantageously, a receiver featuring the spectrum notching feature can notch out a particular frequency band avoiding interference with a signal transmitting at the particular frequency band.

Also, a radar system, using the present invention can avoid a jammer jamming at a particular frequency.

Further features and advantages of the invention, as well as the structure and operation of various exemplary embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of an exemplary embodiment of the invention, as illustrated in the accompanying drawings.

FIG. 2C is an exemplary diagram of a pulse train having a spectral notch that is generated according to the present invention.

FIG. 6C illustrates use of a first code to specify subcomponents within a value range layout and a second code to specify discrete values within the subcomponents specified by the first code.

DETAILED DESCRIPTION OF AN EXEMPLARY EMBODIMENT OF THE PRESENT INVENTION

Figure 1A:
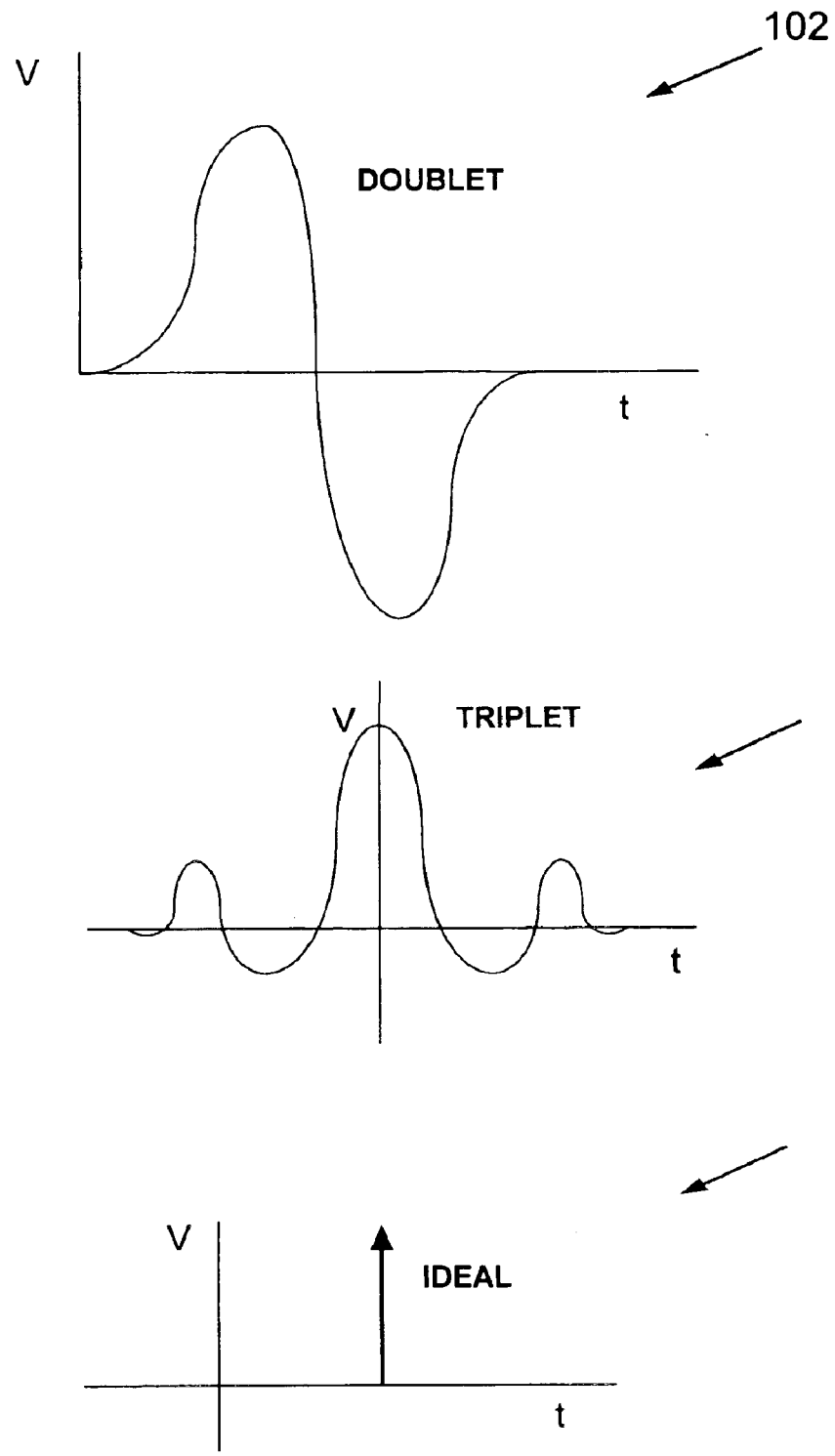
FIG. 1A is a diagram depicting exemplary pulse types that can be used with the impulse transmission system of the present invention.

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview of the Present Invention

The present invention discloses a system, method, and computer program product that in an exemplary embodiment produces a family of time-hopping codes $C_i = (T_k^{(i)}; 0 \leq k \leq N-1)$, $1 \leq i \leq M$, such that each of the codes in the family produces pulse trains that have spectral notches at some pre-defined frequency $f_{null}$. In an exemplary embodiment, the notched codes can be combined with other conventional coding methods including, e.g., time-hopping codes with suitably defined spectral, auto-correlation and cross-correlation properties.

The spectrum of a sequence of identical pulses positioned according to a time-hopping code $(T_k, 0 \leq k \leq N-1)$ is given by $$F(f) = M(f)s(f)$$

where f denotes frequency, s(f) is the spectrum of each of the individual pulses in the pulse train, and M(f) is the code-spectrum:

$$M(f) = \sum_{k=0}^{N-1} e^{2\pi i f T_k}.$$

The formula relates the positioning of the pulses in time to the frequency domain characteristics of the code. Note that s(f) is a function of an individual pulse only, while M(f) is independent of the pulse type, and depends only on frequency and the time-hopping code. Thus, the spectral effects of the time-hopping code are isolated in the code-spectrum. Each time-hopping code element $T_k$ contributes one term to the sum comprising M(f); the total number of terms in M(f) is equal to the length of the time-hopping code. (It can be assumed for simplicity of description that all pulses in the train have identical pulse shape, although this restriction may be relaxed.)

An exemplary embodiment of the present invention generates a family of time-hopping codes $C_i = (T_k^{(i)}; 0 \leq k \leq N-1)$, $1 \leq i \leq M$, with otherwise desired properties, such that for each i=1, 2, . . . M, the spectral multiplier term $M_i(f)$ associated with code $C_i$ is minimized or can be shaped when $f \approx f_{null}$, where $f_{null}$, is a notch frequency within the spectrum.

In this way, by requiring that all N of the terms in M(f) have a small sum when $f \approx f_{null}$ can result in a spectrum of the pulse train that can have a notch at $f_{null}$ when the spectrum is measured over a time-span corresponding to one full code-length. In many cases, it can be desirable for the notch to appear over much shorter time-spans. In order to reduce the time-span during which a spectral notch appears, i.e., "quick notching" all contiguous sub-sums of M(f) can also be designed to be minimized when $f \approx f_{null}$. For "quick notching," M(f) can be defined as follows:

$$M(f; N_1, N_2) = \sum_{k=N_1}^{N_2} e^{2\pi i f T_k}.$$

As already noted, it can be desirable that a family of time-hopping codes $C_i = (T_k^{(i)}; 0 \leq k \leq N-1)$, $1 \leq i \leq M$, be produced with desired properties, such that for each i=1,2, . . . M, and for each pair $N_1, N_2 \in \{0, 1, \ldots N-1\}$ with $N_1 < N_2$, the spectral multiplier term $M_i(f, N_1, N_2)$ associated with code $C_i$ can be small when $f \approx f_{null}$.

Note that the quick notching exemplary embodiment is also a solution to generic notching that generates a notch within the spectra, but not conversely.

The terms in the sum comprising M(f) are sometimes referred to as phasers. As will be apparent to those skilled in the art, phasers represent vectors on a unit circle in the complex plane, and M(f) itself is the vector-sum of these phasers. In order to achieve a spectrum notch, in accordance with the present invention, it is desirable that the sum M(f) and all associated sub-sums, be minimized or shaped in magnitude for values of f near $f_{null}$. In order to accomplish achieving a minimized sum, i.e., to shape, the time-hopping code elements $T_k$ can be chosen so that adjacent terms in the sum represent opposite phasers on the unit circle when $f=f_{null}$. Diametrically opposite phasers (i.e., phasers on opposite ends of a line intersecting a diameter of a unit circle) have an angular separation of 180 degrees, and thus a pair of opposite phasers automatically sums to 0.

Advantageously, according to the present invention, if a time-hopping code ($T_k$, $0 \leq k \leq N-1$) can be chosen so that adjacent code elements correspond to opposite phaser pairs as often as possible, then the time-hopping code can produce a pulse train whose spectrum has a notch at a desired frequency.

All of the methods of the present invention, discussed below, are based on the following observation. Suppose that $f_k \in [0,1)$, $0 \leq k \leq N-1$ is a collection of N numbers in the interval [0,1), satisfying $$\sum_{k=0}^{N-1} e^{2\pi i f_k} = 0.$$

If a time-hopping code $C = (T_k; 0 \leq k \leq N-1)$, $1 \leq i \leq M$ can be defined where $$T_k = \frac{1}{f_{null}}(f_{\sigma(k)} + n(k)),$$

and where σ is any permutation of $\{0, 1, \ldots N-1\}$, and n(•) is any increasing mapping from $\{0, 1, \ldots N-1\}$ into the integers, then the code-spectrum M(f) satisfies $$M(f_{null}) = \sum_{k=0}^{N-1} e^{2\pi i f_{null} T_k} = 0.$$

Hence the time-hopping code C will have a notch in its spectrum at the frequency $f=f_{null}$.

Impulse Transmission Systems

A basic signal produced by an impulse transmission ultra-wideband system is a "pulse." Various types of pulses exist including, e.g., a doublet, and a triplet. Graphed with voltage on the vertical axis and time on the horizontal, the pulses shown in FIG. 1A are illustrative of exemplary pulse types that can be used in an impulse transmission system. FIG. 1A depicts an exemplary embodiment of a doublet pulse 102. Another pulse type that can be produced by an impulse transmission system is a triplet 104, also referred to as the "W" pulse type. As will be apparent to those skilled in the art, other signals and pulse types can also be used within the scope of the present invention. For example, a digital, or square wave (not shown) is another pulse type.

Another useful pulse type is an ideal pulse 106 also illustrated in FIG. 1A. The ideal pulse 106 can also be referred to as a model pulse, an impulse, a delta function, or a spike. As is known, other pulse types 102, 104 can be represented as a convolution of the ideal pulse 106 with a real shape. In the development of time-domain analysis techniques, an integral known as the convolution integral arises. A signal can be found by convolving a system characterizing function with a system input to obtain the system output. In this description, the ideal pulse 106 is used for analysis purposes. However, one of ordinary skill in the art will appreciate that any pulse type can be used by producing a corresponding real pulse shape from the ideal pulse.

Figure 1B:
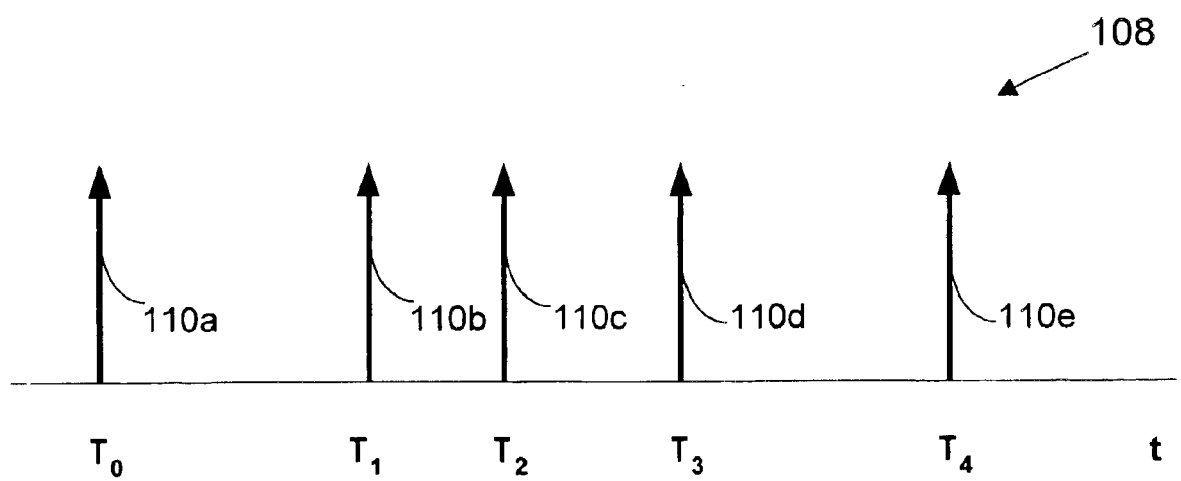
FIG. 1B is an exemplary embodiment of a pulse train that can be used with the impulse transmission system of the present invention.

An impulse transmission system can transmit a sequence of pulses referred to as a "pulse train." FIG. 1B depicts an exemplary pulse train 108 including the sequence of pulses occurring over time. The pulse train 108 is drawn irregular to indicate the application of time-hopping on positioning of pulses over time. Frequency characteristics of the UWB signal corresponding to a pulse train 108 have to do with the type of pulse being transmitted, and a time-hopping code that is used to position the pulses within the pulse train 108.

The present invention generates time-hopping codes that produce desirable spectral properties, including, e.g., properties that avoid a particular frequency. A time-hopping code $T_k$, (where k=0, 1, 2 . . . N–1) defines positioning of pulses 110a–110e, (collectively pulses 110) of pulse train 108. An advantage of the present invention is that it provides techniques to design time hopping codes (THCs) that have desired frequency domain properties, i.e. desired spectral properties.

Figure 2A:
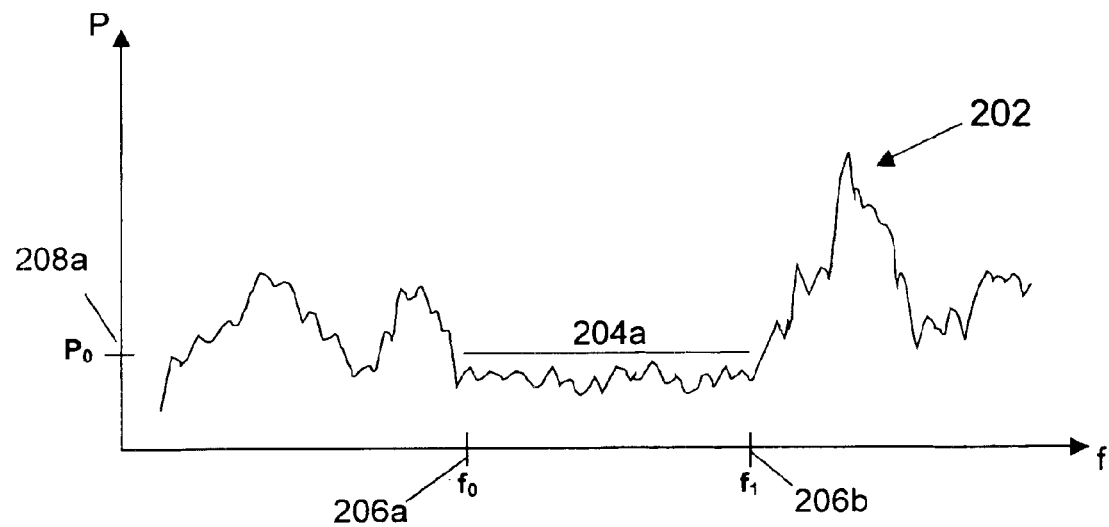
FIG. 2A is an exemplary embodiment of a pulse train (or UWB signal) having a spectral notch according to the present invention.

FIG. 2A depicts an exemplary graph 202 of a power spectral density function of a desired spectrum with a spectral notch 204a. In the frequency domain, for various reasons including those discussed above, there can be a desire to obtain a defined spectrum or power spectral density function. For example, suppose that one desires to transmit below a particular power level in the GPS frequency band. Graph 202 includes power on a vertical axis and frequency on a horizontal axis and illustrates the spectral notch 204a at a power level $p_0$ 208a between frequencies $f_0$ 206a and $f_1$ 206b. Having identified the frequency region, or frequency band, between $f_0$ 206a and $f_1$ 206b, within which perhaps it is undesirable to place a substantial amount of radiated spectrum, the present invention can be used to position pulses over time to cause the power spectrum to be below the particular power level $p_0$ 208a within a specified frequency band.

Figure 2B:
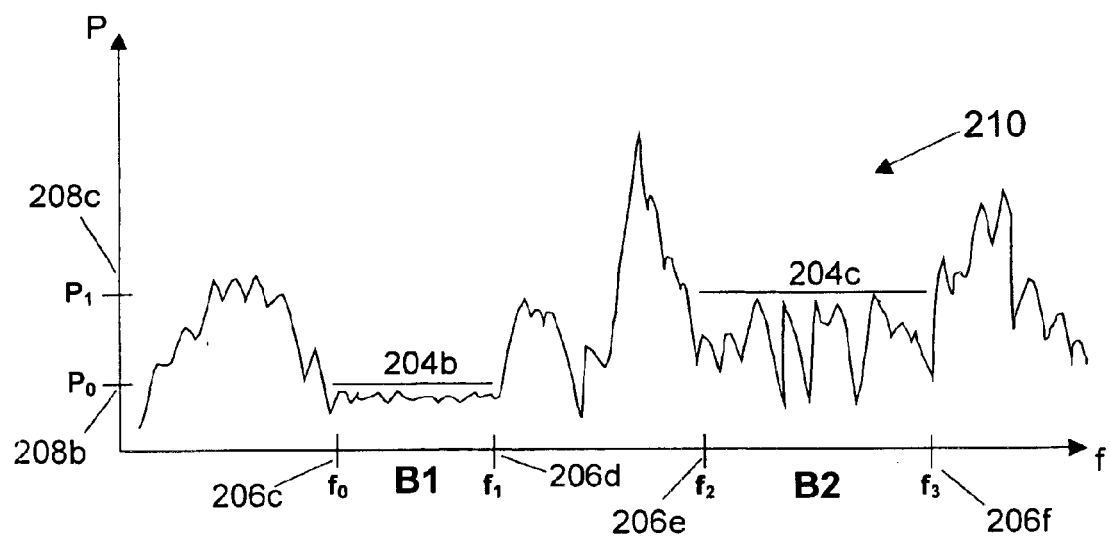
FIG. 2B is an exemplary embodiment of a pulse train or UWB signal having a spectral envelope according to the present invention.

FIG. 2B illustrates an exemplary envelope spectral density function 210. Envelope spectral density function 210 can include two spectral notches 204b and 204c. A spectral notch 204b, spanning from frequency $f_0$ 206c to $f_1$ 206d, could have a very low desired power level $p_0$208b, whereas a spectral notch 204c, spanning from frequency $f_2$ 206e to $f_3$ 206f, could have a fairly low desired power level $p_1$ 208c. Thus, according to the present invention, a desired spectral characteristic can be produced for a pulse train by shaping the code spectrum according to a spectral template such as the illustrated envelope. In another exemplary embodiment, it can be desirable to maintain a power level below the entire window 210, or throughout a frequency range from, e.g., frequency $f_0$ 206c to $f_3$ 206f.

FIG. 2C depicts an exemplary spectral notch 204d, with a narrow width relative to the width of the entire spectral density function. For example, suppose that in an exemplary embodiment, it is desirable to have a notched spectrum 204d at a specific frequency $f_0$ 206i with a frequency span from frequency $f_1$ 206g to $f_2$ 206h. The present invention provides in an exemplary embodiment a method for generating pulse positions using a THC to achieve the notched spectrum 204d of FIG. 2C.

For ultra-wide band (UWB), the pulse energy can be spread out over, e.g., 2 GHz of frequency bandwidth. Exemplary transmitters and receivers whose signals could be avoided using a spectral notch can include narrow band systems. Narrow band systems can have frequency bands orders of magnitude smaller, such as, e.g., 4–10 Mhz wide for GPS bands, or kHz wide for audio bands, in comparison to a gigahertz power spectrum of the UWB transceiver. For example, in an exemplary embodiment, a frequency span of the notch 204d can be a couple MHz, or 0.001 of the 2 GHz bandwidth.

The frequency span of the spectral notch 204d, in an exemplary embodiment can be relatively small, determined by factors outside of a time hopping code designer's control. For example, the UWB transceiver equipment in an exemplary embodiment can operate at a certain average pulse repetition frequency (PRF) rate, which normally can not be changed, since the PRF rate can be dependent on the transceiver hardware, which can affect the width of the pulse.

Thus, the present invention advantageously, based on selection of a particular frequency $f_0$, can notch out the frequency and can attenuate some nearby frequencies within a frequency span using what can be referred to as a "high Q filter." According to the present invention, a desired spectral characteristic can be produced for a pulse train by shaping the code spectrum according to a spectral template to obtain the illustrated spectral notch.

A Spectrum Notch of the Present Invention

The present invention advantageously relates the time hopping code (THC) to the frequency graphs, i.e., through a Fourier transform. The THC defines positions of a series of pulses where the pulses can be thought of as a signal of delta functions. The transmitted signal is represented by a sum of the pulses $T_a 110a$–$T_A 110e$. The positioning of the pulses 110a–110e are dependent on the THC.

$$s(t) = \sum_{k=0}^{N-1} f(t-T_k). \quad \text{Equation 1}$$

Referring to Equation 1, the signal s(t), where N is the length of the THC $T_k$ of the delta functions of FIG. 1B, is a summation from k=0 to N−1 of a function f (t−$T_k$). Signal s(t) is a functional representation of the pulse train 108 that the impulse radio transceiver equipment generates. According to the present invention, a Fourier transform (FT) can be performed on the signal s(t) in order to obtain a functional representation of the frequency spectrum of the signal s(t).

$$FT[s(\omega)] = \int_{-\infty}^{\infty} s(t) e^{-2\Pi ift} dt. \quad \text{Equation 2A}$$

$$FT[s(\omega)] = \sum_{k=0}^{N-1} \int_{-\infty}^{\infty} \partial(t-T_k) e^{-2\Pi ift} dt. \quad \text{Equation 2B}$$

$$S(f) = \sum_{k=0}^{N-1} e^{-2\Pi ifT_k}. \quad \text{Equation 3}$$

Equation 2A illustrates that the FT of signal s(ω) is the integral of the signal s(t) against a kernel which is a trigonometric exponential $e^{-2\Pi ift} dt$. When the integral of Equation 2A is performed, substituting in the expression of Equation 1 results in Equation 2B. As will be apparent to those skilled in the art, simplifying, Equation 3 is obtained, where code spectrum S(f) is a sum of the transforms of the delta functions. The delta functions can sample the values at the time values that can make the time value equal to zero. Equation 3 is a frequency domain representation of the signal s(t), i.e., a code spectrum, S (f), which is a function of frequency.

Figure 3:
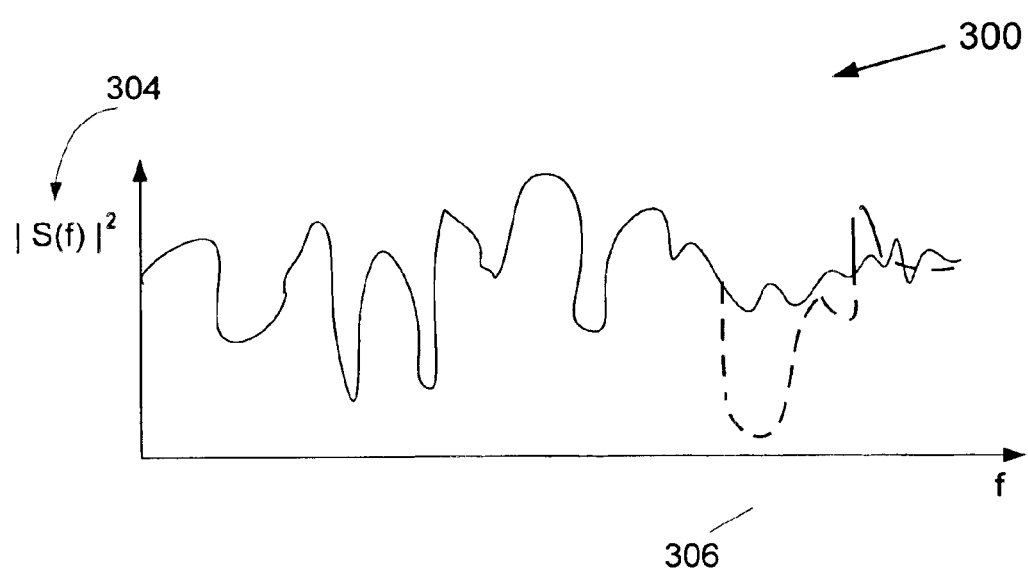
FIG. 3 is an exemplary graph illustrating a comparison of a non-modified and modified spectral magnitude that positions pulses according to the present invention.

Graphing the spectral magnitude (i.e., $|S(f)|^2$ 304) of Equation 3 results in graph 302 depicted in chart 300 of FIG. 3. The graph 302 is the same as if a spectrum analyzer were coupled to the transceiver equipment generating the signal s(t).

The present invention desires to notch out, shape, or minimize the spectral magnitude at a frequency $f_{null}$ 306 of a portion of code spectrum S(f) 302 yielding a spectral notch 308.

Given a frequency $f_{null}$ and a code length N, the present invention generates a THC $T_k$, that defines pulse positions of length N, where 0≦k≦N−1, such that, the associated frequency code spectrum S(f) 302 is zero at frequency $f_{null}$ 306. Thus, according to the present invention, one assumes that at a frequency $f_{null}$ of interest, it is desirable that the spectrum be shaped, minimized, or equal to a small value approaching, or equal to 0. The present invention yields the desired spectrum equal to 0 at frequency $f_{null}$ by recognizing the dependence of Equation 3 on the periodicity of the exponential. The time hopping code $T_k$ can be selected such that S($f_{null}$)=0. The present invention supposes that an N number of frequencies ($f_k$, i.e., $f_0$, $f_1$, $f_2$ . . . $f_n$) could be found, strictly between zero and one, (0,1), such that the vector sum of Equation 4 from k=0 to N−1 of e to the $-2\Pi if_k$ power would be minimized, shaped, or equal to 0.

$$\sum_{k=0}^{N-1} e^{-2\Pi if_k} = 0. \quad \text{Equation 4}$$

Figure 4:
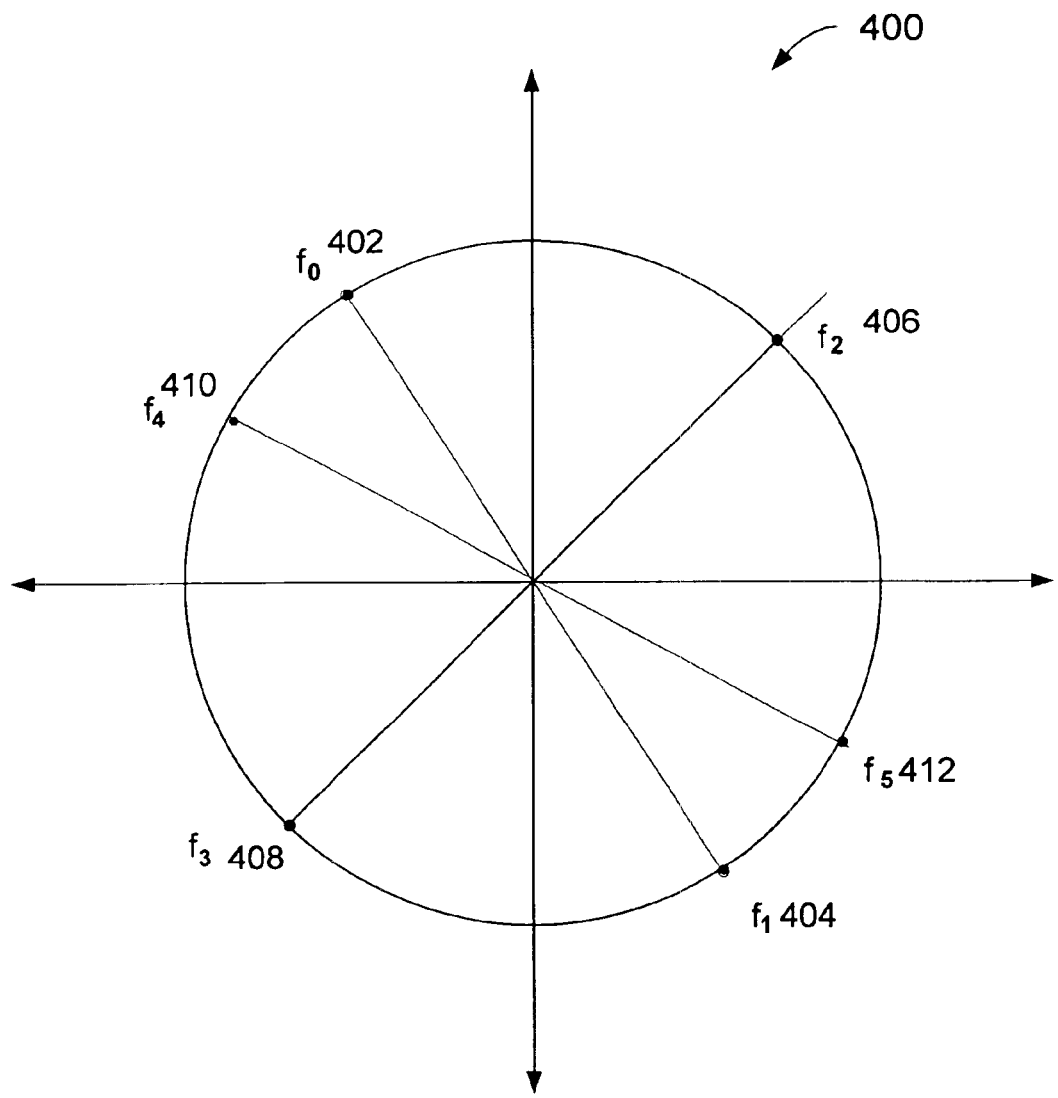
FIG. 4 is an exemplary graph of a unit circle depicting diametrically opposite canceling phaser pairs that are used in accordance with the present invention.

Equation 4, graphically can be represented as phasers on a unit circle as shown in diagram 400 of FIG. 4. The exponential e to the power of $-2\Pi if_k$ of Equation 4 can be represented as e to the iΘ.

It will be apparent to those skilled in the art that complex numbers can be represented as a point in 2 dimensional (2D) space a point (x,y) on the Cartesian plane. That is to say, complex numbers are vectors in 2D space. As will be apparent to those skilled in the art, the exponential $e^{i\Theta}$ is equal to the sum of cos Θ and i sin Θ. It is axiomatic that as Θ is varied, the vector corresponding to the exponential travels around a unit circle of diagram 400 of FIG. 4, i.e., a circle of radius one. Each of the $-2\Pi if_k$ of Equation 4 is one of these angle Θs. As will be apparent to those skilled in the art, the individual terms are called phasers. The present invention selects a number of points on the unit circle, such that the vector sum of the selected points adds to 0. Accordingly, the present invention relies on the vector sum of all these phasers being minimized, shaped, or equal to zero.

The present invention, in an exemplary embodiment, begins with the unit circle, and can initially involve choosing a value on the unit circle $f_0$ 402. The present invention advantageously, according to an exemplary embodiment, can include choosing a point $f_1$ 404 diametrically opposite point $f_0$ 402 on the unit circle, creating a pair of opposite phasers ($f_0$ 402, $f_1$ 404) that sum to zero. The pair of opposite phasers can cancel one another out.

The present invention, in an exemplary embodiment, can include continuing by adding opposite phaser pairs, such as, e.g., ($f_2$ 406, $f_3$ 408) or ($f_4$ 410, $f_5$ 412), that can continue to cancel. In the phaser diagram 400 of FIG. 4, for example, $f_0$ 402 and $f_1$ 404 cancel; $f_2$ 406 and $f_3$ 408 cancel; and $f_4$ 410 and $f_5$ 412 cancel.

Advantageously, in an exemplary embodiment of the present invention, any evenly spaced configuration, such as, e.g., 4 phasers evenly spaced around the unit circle, such as, e.g., $f_0$ 402, $f_1$ 404, $f_2$ 406, and $f_3$ 408; or 3 phasers evenly spaced around the unit circle (i.e., forming an equilateral triangle, not shown); would still have a vector sum of zero. Thus any number such as, e.g., 5, 10, 50, 100, or more evenly spaced phasers, or an odd or even number, (none of which are shown in FIG. 4) would still sum to zero.

An exemplary embodiment of the present invention can include randomly choosing a first phaser $f_0$ 402, and then adding its diametric opposite phaser $f_1$ 404. In accordance with the present invention, everytime one adds a first phaser, one can add a canceling phaser. Advantageously, this process can generate a robust notch, i.e., it will be difficult not to detect the notch. The process of the exemplary embodiment can include immediate cancellation, rather than having to wait, e.g., 5 pulses, for cancellation of phasers of an exemplary embodiment using 5 phasers evenly spaced about a unit circle.

In one embodiment, the pulses of a signal s(t) can emanate from an antenna. If measurement equipment is set up even slightly wrong, and one relies on, e.g., 5 phasers evenly spaced, to cancel each other out, it is possible that the intended result of fully canceling phasers to yield the spectrum notch 308 might never be accomplished. When phasers are selected to cancel one another out, the energy from the canceling phasers does not disappear, the energy instead is moved out of one space, and into another. If, according to the present invention, one uses a very regular structure, using, e.g., 3 phasers evenly spaced, where the spacing is not quite perfectly even, cancellation in the code spectrum can work well at first, but eventually a big spike can occur somewhere else and also, possibly, no cancellation could occur at an intended spectrum notch frequency span. For example, if, e.g., 3, 4, 5, etc. phasers evenly spaced are used and just a slight shift is manifested, because of, e.g., a malfunction of equipment, then cancellation potentially might not occur, leading to, e.g., no notch, or a suboptimal notch, since the energy of the phasers remains but is shifted to other frequencies.

Since the present invention including selection of canceling groups of phasers can provide the desired frequencies $f_k$, the present invention can also provide a desirable time-hopping code (THC). Using the phasers $f_k$ obtained as described above, the present invention enables generation of various THCs out of that sequence of phasers $f_k$.

Recall from above that it is desired that the code spectrum at $f_{null}$ be equal to zero, i.e., $S(f_{null})=0$. Thus, it is desirable that the THC formula of Equation 3, be minimized, shaped, or set to zero as shown in Equation 5 below.

$$S(f_{null}) = \sum_{k=0}^{N-1} e^{-2\Pi i f_{null} T_k} = 0.$$  Equation 5

If the angle from the THC of Equation 5, $-2\Pi f_{null} T_k$, were equal to angle $-2\Pi f_k$ of Equation 4, then the desired notch of the present invention results. Mathematically, it will be apparent to those skilled in the art, that $e^{i\Theta}$ is equal to the sum of $\cos \Theta$ and $i \sin \Theta$. Since both the sine and cosine functions are periodic with period $2\Pi$, the angles $-2\Pi f_{null} T_k$ and $-2\Pi f_k$ need only be equal for an integer multiple $n_k$ of $2\Pi$. Thus an integer multiple $2\Pi n_k$ can be added to the $-2\Pi f_k$ and the angle can be set equal to $-2\Pi f_{null} T_k$ to obtain Equation 6.

$-2\Pi f_{null} T_k = -2\Pi f_k + 2\Pi n_k$  Equation 6.

The integer $n_k$ could be positive or negative, so multiplying by $-1$ on both sides of the equation can result in positive terms and the $2\Pi$ coefficient can cancel out of all terms resulting in Equation 7 below.

$f_{null} T_k = f_k + n_k$  Equation 7.

Since all variables in Equation 7 are known but $T_k$, solving for $T_k$ results in Equation 8 below.

$T_k = (1/f_{null})(f_k + n_k)$, where $n_k$ is any integer.  Equation 8.

According to an exemplary embodiment of the present invention, where it is desired that the code spectrum at frequency $f_{null}$, be notched out, one can choose an $n_k$ to vary the pulse repetition frequency (PRF) of the THC. In an exemplary embodiment, if $n_k$ is a random value with a mean of a certain value such as, e.g., 50, then a PRF of a certain value results. If the mean was instead made 25, then the result would be half as much distance between pulses, or twice as large a PRF than the certain value of the exemplary case. No matter what $n_k$ is, the spectrum is still zero at $f_{null}$. The value of $n_k$ can be dependent on the transceiver hardware used.

In summary, the basic technique of an exemplary embodiment of the invention, given a frequency $f_{null}$ at which it is desired that the code spectrum be minimized, and shaped, and given a code length $n_k$, can include:

Step 1 including choosing a set of pairs of phasers $f_k$, for k=0 to N−1, an exemplary method can include selecting diametrically opposite canceling phaser pair approach, with the approach's inherent randomness feature; alternatively, a higher even number of equally spaced canceling phasers could be used; or alternatively, if an odd number of pulses is desired, such as, e.g., 9, then a number of even phasers (e.g., 6) could be chosen using the random opposite phaser pair approach, and then the last three phasers could be equally spaced on the unit circle (i.e., forming an equilateral triangle around the unit circle); and Step 2 including forming the time hopping code $T_k$ where $T_k=(1/f_{null})(f_k+n_k)$, and where $n_k$ is any integer which may be constrained by hardware requirements. The $n_k$ could be selected randomly, but, perhaps, e.g., out of a predefined group. The hardware and an $n_k$ corresponding to the properties of the transceiver hardware can determine the width of the spectral notch 204d. The PRF can be typically fixed for a given application, and the PRF dictates the $n_k$.

It is important to note that the present invention has been described generating notches by positioning a sequence of pulses in time using a time-hopping code. The pulses have been drawn (e.g., as in FIG. 1B) using an ideal pulse type 106. When the pulses 110a–e are not mathematically perfect, the same desired notch 204d can result. No matter how imperfect the pulses 110a–e are, the resulting code spectrum will have a spectral notch 204d at the desired frequency $f_{null}$. This is because, as will be apparent to those skilled in the relevant art, the code spectrum of the real pulse train is related to the spectrum of the ideal pulse train 108 by convolution. This means that one can convolve the spectrum of an individual pulse with the code spectrum to get the real spectrum using known methods.

In another exemplary embodiment, to generate notches, the positioning of the pulses using a time-hopping code can be varied specifying temporal characteristics, but can also be varied in terms of non-temporal characteristics such as, e.g., polarity of the pulse. Persons having ordinary skill in the art will realize that a spectral notch can be accomplished according to the present invention where other non-temporal characteristics are varied, including, e.g., pulse type, pulse amplitude and pulse width. According to another exemplary embodiment of the present invention, a pulse train 108 that has both a time hopping code temporal characteristic component and a non-temporal characteristic such as polarity can be used to obtain a similar desired spectral notch 204d.

Figure 5A:
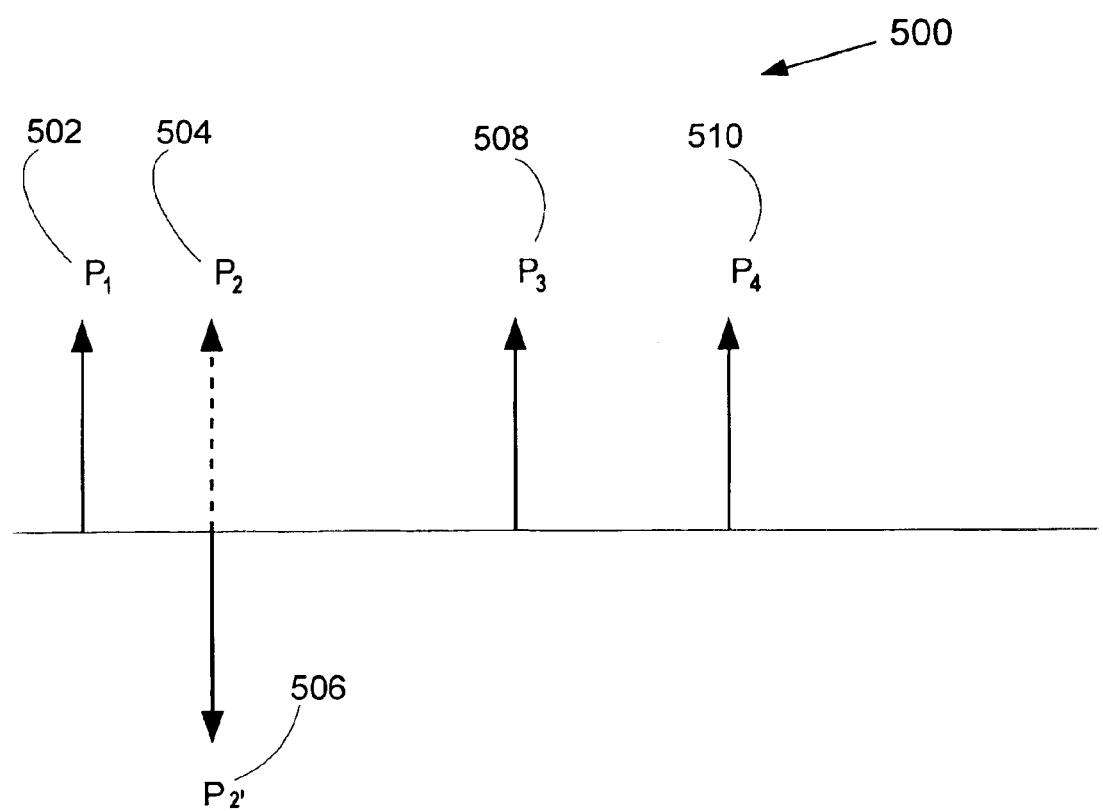
FIG. 5A is an exemplary diagram of a pulse train including positive and negative polarity pulses that are positioned according to the present invention.
Figure 5B:
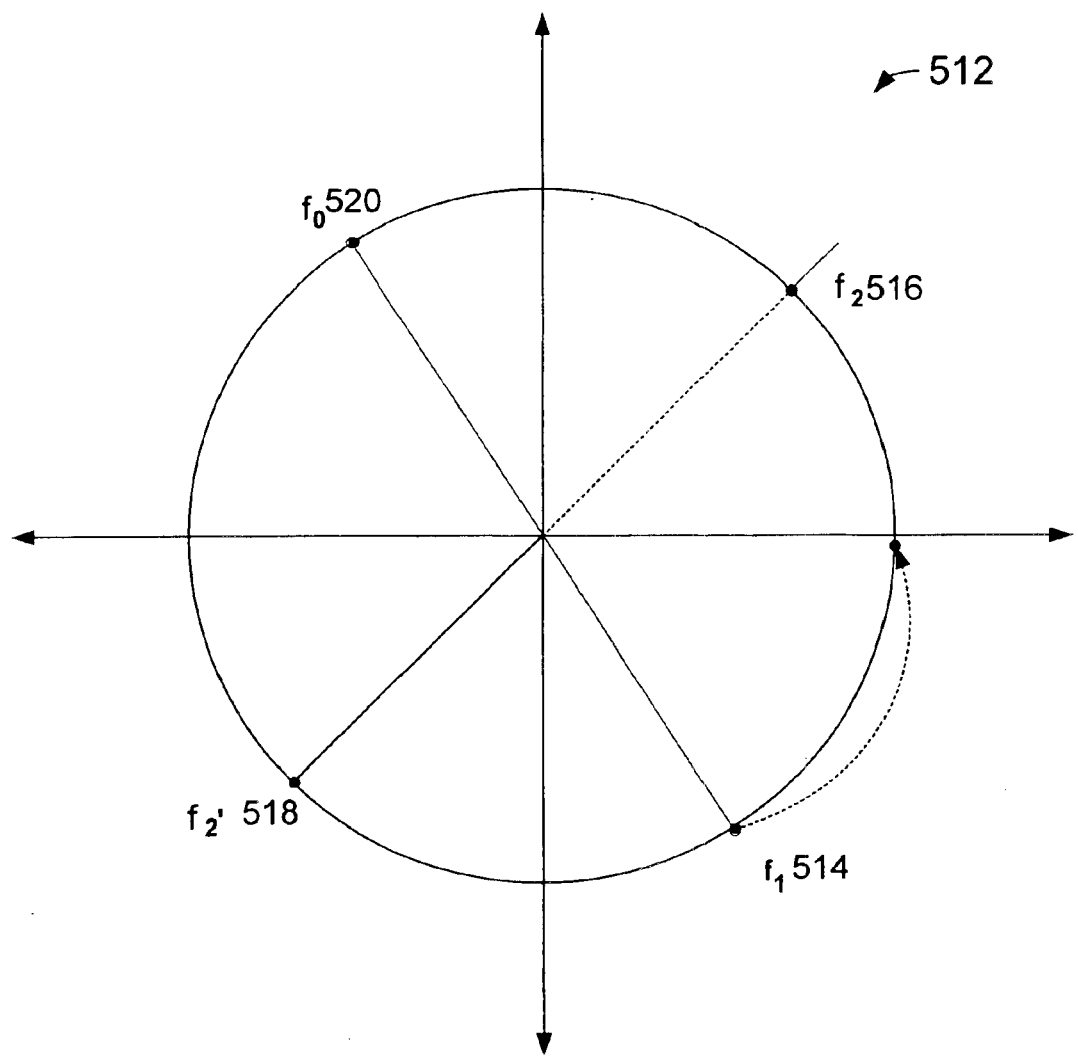
FIG. 5B is an exemplary graph of a unit circle illustrating balancing of a negative polarity phaser according to the present invention.

FIG. 5A depicts an example of a non-temporal characteristic of a pulse, i.e., the polarity of a pulse. Other non-temporal characteristics are described in the related patent applications and include, e.g., the amplitude, and other characteristics of pulses, and could similarly be used within the scope of the present invention. Specifically, FIG. 5A depicts an exemplary embodiment of such a pulse train 500 of pulses $p_1$ 502, $p_2$ 504, $p_{2'}$ 506 (a negative polarity pulse), $p_3$ 508, and $p_4$ 510. The exemplary embodiment can correspond to a number of phasers $f_k$ on the unit circle that can be determined from the relative positioning of the pulses $p_k$. If a pulse $p_{2'}$ 506 has negative polarity, then the location of the corresponding phaser $f_{2'}$ 518 on the unit circle would be diametrically opposite the phaser $f_2$ 516 as shown in phaser diagram 512 of FIG. 5B. To balance the phasers, one could, e.g., move phaser $f_1$ 514 to balance out phaser $f_{2'}$ 518.

Exemplary Simulation Results

Figure 7A:
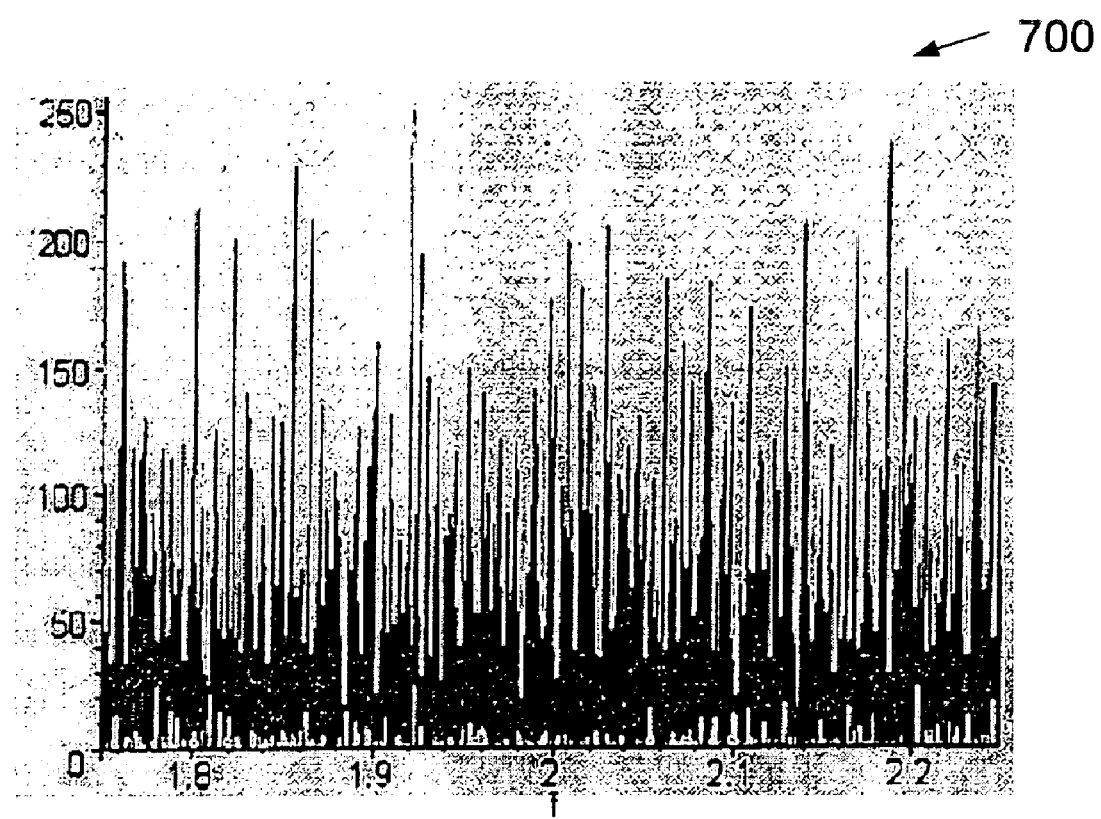
FIG. 7A depicts an exemplary graph of a power spectrum between frequencies of 1.75 and 2.5 GHz in an illustrative simulation.
Figure 7B:
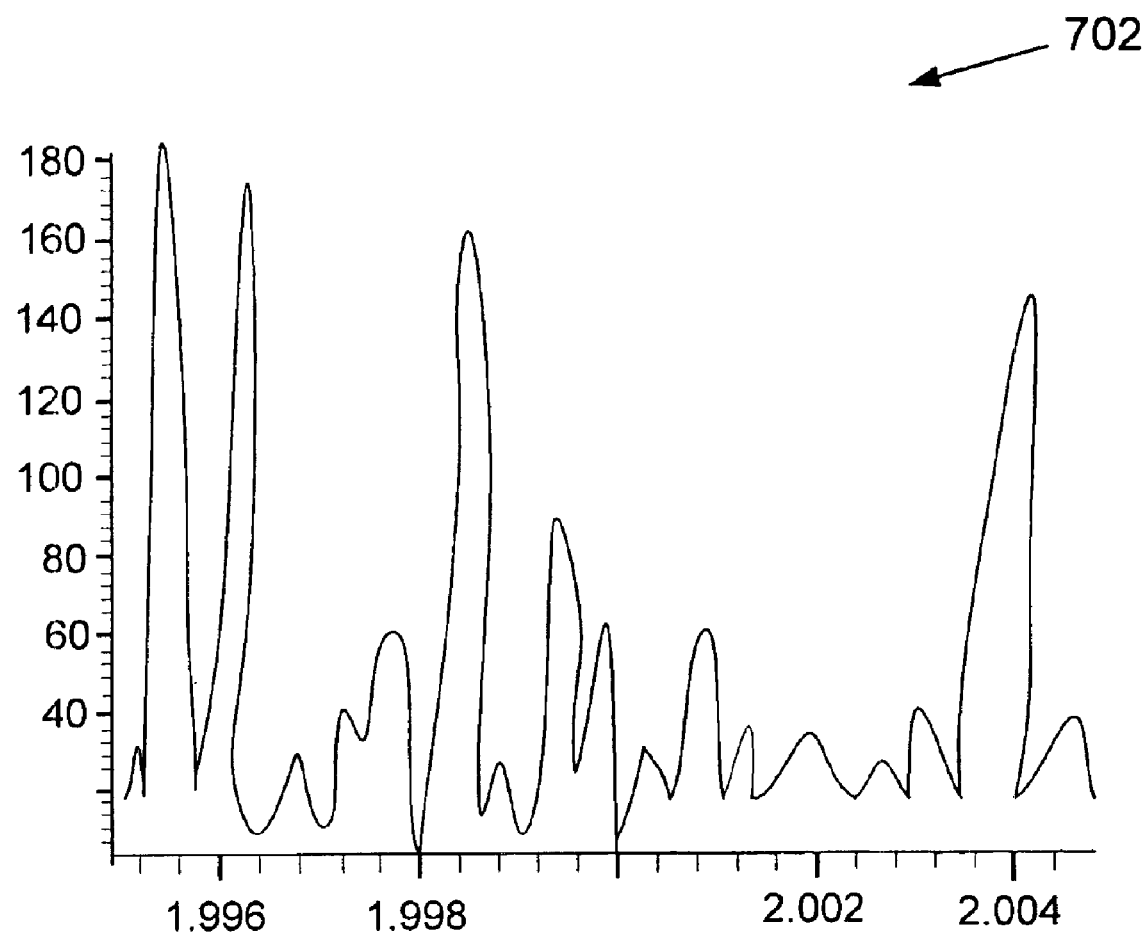
FIG. 7B depicts a graph of the power spectrum of FIG. 7A within a frequency range centered at about 2.0 GHz.

FIG. 7A depicts an exemplary embodiment of a graph 700 of a generic code spectrum between an ultra-wide band frequency span from about 1.75 to 2.5 GHz. FIG. 7A as shown illustrates a lot of random spikes. FIG. 7B depicts a portion of graph 700 graph 702, from a frequency span from approximately 1.99, to 2.0045 GHz. Graph 702 of FIG. 7B depicts the power code spectrum appearing to get close to zero near a frequency of about 2.0 GHz. According to one embodiment of the present invention, a spectral notch 204d can be generated using, e.g., a quadratic congruential time-hopping code (with desired correlation properties) with the spectral notch 204d at a frequency of $f_{null}$ of approximately 2.0 GHz; with a length of 32 to make the computations minimal; with a frame size of, e.g., 100 ns (relating to the average distance between two pulses); and with a code span of e.g., 50% (meaning the pulse has to be in the first half of the frame).

Figure 7C:
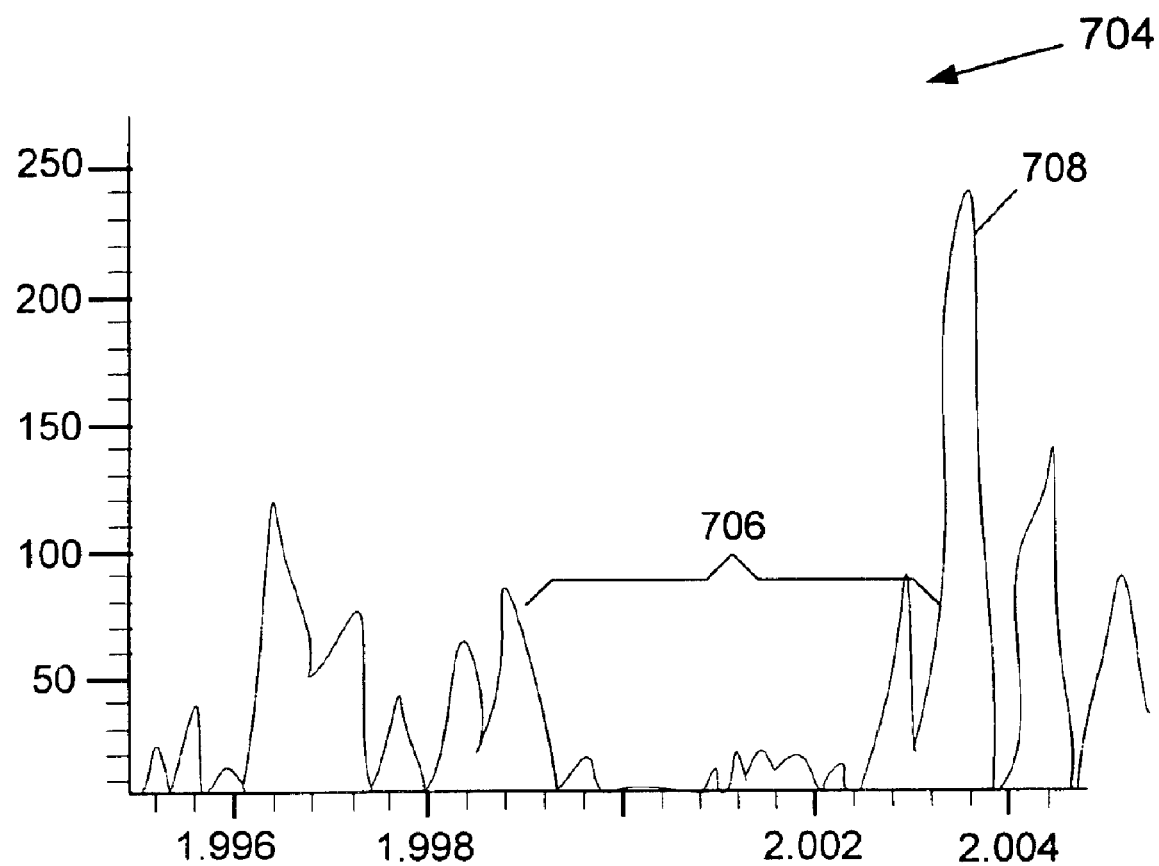
FIG. 7C depicts an exemplary graph of a spectrum notch produced at about 2.0 GHz in accordance with the present invention.

FIG. 7C depicts an exemplary graph 704 of a view of the resulting code spectrum using the same axes as the previous graph 702, showing spectral notch 706. Spectral notch 706 has lowered the code spectrum at a frequency span around a frequency of approximately 2 GHz. The energy from the frequency span of the spectral notch 706 has moved to create a spike 708 at the right edge of the notch 706. The notch 706 appears from a frequency of approximately, around 1.999 GHz to a frequency of around 2.003 GHz, i.e., about a 4 MHz wide notch. For the exemplary embodiment of the invention illustrated in FIG. 7C, the frequency span of the spectral notch 706 can be around less than 10 MHz. The frequency span of the spectral notch 706 is dependent on various factors including, e.g., the hardware equipment used as a transceiver.

Figure 8:
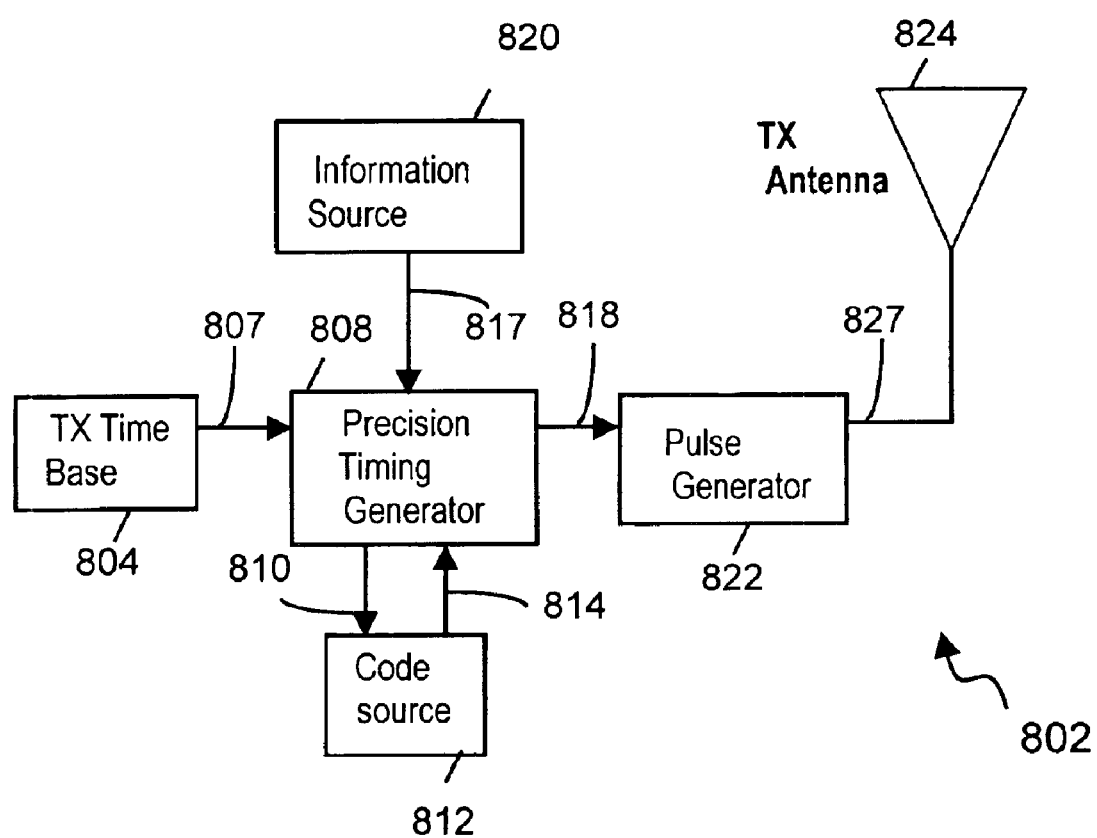
FIG. 8 is a block diagram of an impulse transmitter according to an exemplary embodiment of the present invention.
Figure 9:
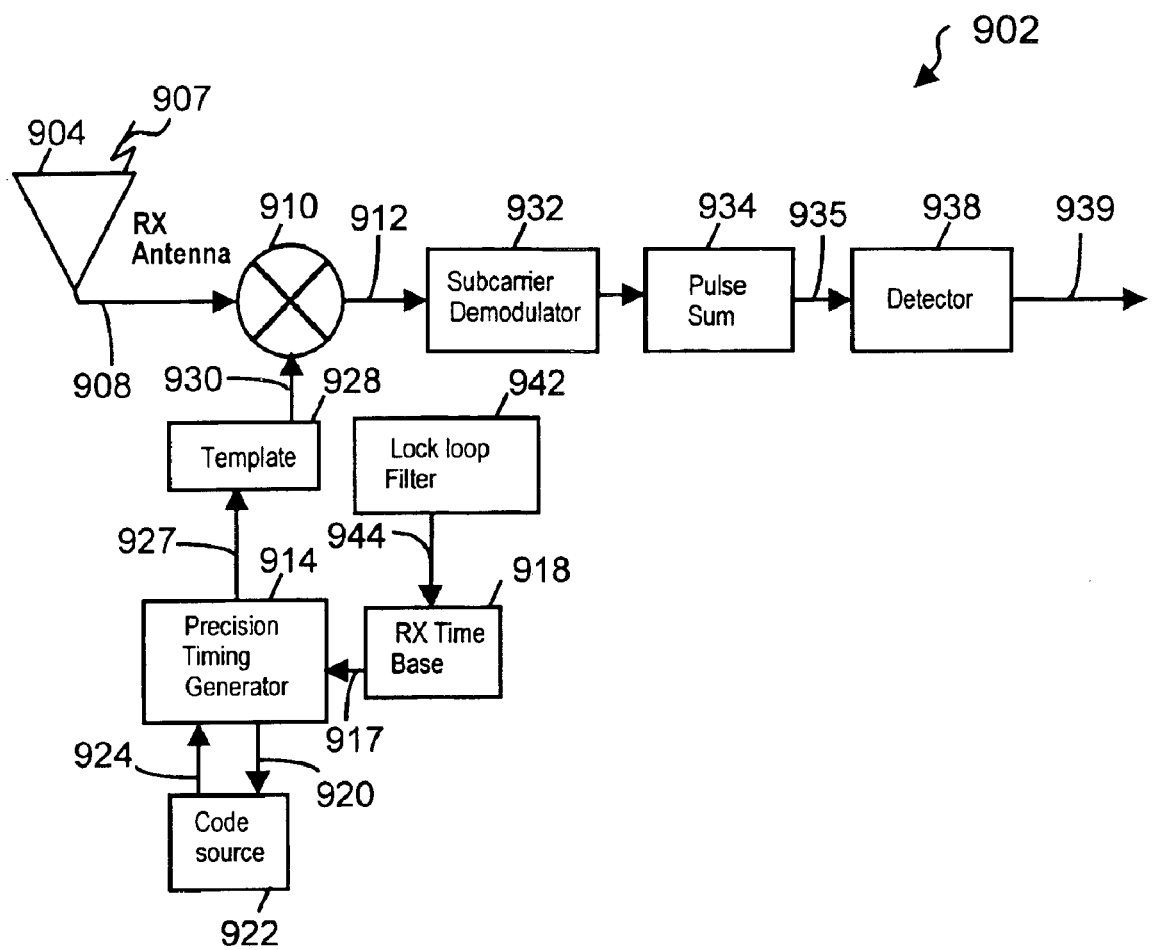
FIG. 9 is a block diagram of an impulse transmitter according to an exemplary embodiment of the present invention.

Exemplary transmitters and transceivers are discussed in greater length below with reference to FIGS. 8 and 9, after the descriptions of FIGS. 10 and 11. The invention can be incorporated into, e.g., a transmitter, a receiver, a transceiver, or a radar system.

For further information, the reader is directed to "Comment on Notice of Proposed Rulemaking FCC 00-163," adopted May 10, 2000, ET Docket 98-153, comments of Aether Wire & Location, Inc., pp. 1–15, U.S. Pat. No. 6,002,708 ('708) to "Spread Spectrum Localizers," to Fleming et al., filed May 23, 1997, and U.S. Pat. No. 5,748,891 ('891) to "Spread Spectrum Localizers," to Fleming et al., filed Jul. 22, 1994, the contents of which are incorporated herein by reference in their entirety. The '708 and '891 patents apparently disclose localizers that use cancellation nulling of multiple pairs of adjacent opposite polarity pulses where the time difference between each of the opposite polarity pulses in a pair of pulses is a fixed time period to in the time domain. The localizers of the '708 and '891 patents, require that the pulses in a pair of pulses must have opposite polarity. Also, the distances between two pulses in a pair must remain constant among all pairs of pulses.

The present invention has several important differences from the pulse pair cancellation approach disclosed in '708 and '891. The spectrum notching technique of the present invention advantageously does not require notching on a pulse pair by pulse pair basis. Further, the present invention does not require that each pulse be accompanied by an opposite polarity pulse. In fact, as already described, all pulses can have the same polarity according to the present invention. Moreover, unlike the required fixed distance in time between the pulses of each of the pulse pairs of the '708 and '891 patents, the distance between a first pair of two adjacent pulses, and the distance between another pair of adjacent pulses, according to the present invention, need not be constant. Also, unlike the present invention, the '708 and '891 patents are not able to maintain the correlation properties of a designed code. Further, patents '708 and '891, alone or in combination, do not teach or suggest the method of selecting a balanced group of phasers to shape the code spectrum to obtain, e.g., a spectral notch in the code spectrum, while preserving predefined code characteristics, such as, e.g., correlation and spectral properties.

In an exemplary embodiment of the present invention, a time hopping code can be shifted achieving cancellation leading to a spectral notch 204d. The '708 and '891 patents, alone or in combination, do not teach or suggest the technique of the present invention including shifting a time-hopping code to achieve a spectral notch.

Algorithms for Generating Notched Code Families

According to the present invention, by choosing different mappings n(•), and different permutations, a family of time-hopping codes can be generated, forming a code spectrum with a spectral notch at frequency $f_{null}$. In an exemplary embodiment of the present invention, at least two broad methodologies can be used to do this.

Pseudo-random Methodology

Mapping n can be chosen in accordance with a randomizing scheme according to the present invention. Randomly choosing n results in a family of pseudo-random notched codes.

According to the present invention, various exemplary embodiments of algorithms can be presented for generating notched codes producing spectral notches in corresponding code spectrum. The first two exemplary algorithms are examples of the pseudo-random methodology, while the third exemplary algorithm discussed below is an example of a combination coding methodology.

The following is described using a notational convention where, if $S=\{s_i, 1 \leq i \leq N\}$ is a finite set of elements $s_i$, then the symbol $\hat{s}=s_{i_1}s_{i_2}\ldots s_{i_m}$, where the $s_{i_j}$'s are elements of S, can be called a "word" on the "alphabet S." Note that the order of the "letters" in a word $\hat{s}$ can be important.

Deterministic Phasers Algorithm

Figure 10:
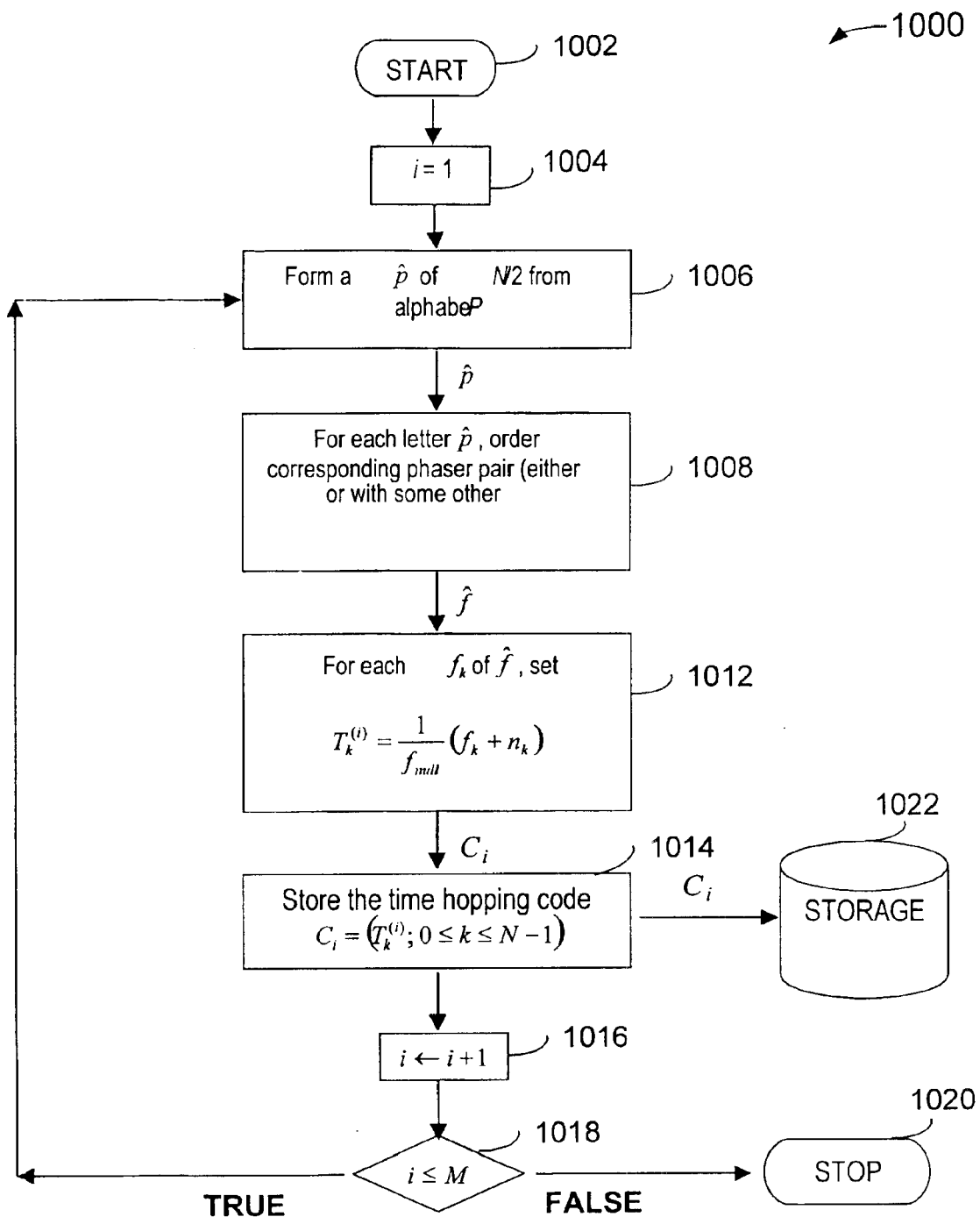
FIG. 10 depicts a flow diagram of a deterministic phasers algorithm used for positioning pulses according to the present invention.

FIG. 10 depicts an exemplary embodiment of a flow diagram 1000 illustrating a deterministic phasers algorithm. The flow diagram of FIG. 10 can have among its inputs a predetermined set of opposite phaser pairs satisfying Equation 4 above, and can use these deterministic phasers to generate a family of pseudo-random notched codes.

Inputs can include:

N—time-hopping code length, an even positive integer number;

M—number of time-hopping codes, a positive integer number;

$f_{null}$—frequency to null, a positive real number;
$F=\{f_j, 1\leq j\leq 2I\}$—family of frequencies satisfying $$\sum_{k=1}^{2I} e^{2\pi i f_k} = 0,$$

where each $f_j$ lies in the interval spanning from [0,1);
$P=\{p_i=\{f_{i,1}, f_{i,2}\}, 1\leq i\leq I\}$—decomposition of F into pairs of opposite phasers; and
$n(\bullet)$—one or more increasing maps from $\{0, 1, \ldots, N-1\}$ into non-negative integers.

Outputs can include:

$C_i=(T_k^{(i)}; 0\leq k\leq N-1), 1\leq i\leq M$—a family of time-hopping codes, each with a spectral notch at $f_{null}$. There can be M codes in the family, each of length N.

Processing Flow for Deterministic Phasers Algorithm

FIG. 10 depicts an exemplary embodiment of flow diagram 1000. Flow diagram 1000 can begin with step 1002 and can continue immediately with step 1004.

In step 1004, a counter i can be initialized by setting i=1. From step 1004, flow diagram 1000 can continue with step 1006.

In step 1006, a random word $\hat{p}=p_{i_1}p_{i_2}\ldots p_{i_{N/2}}$ of length N/2 from the alphabet P, can be formed. From step 1006, flow diagram 1000 can continue with step 1008.

In step 1008, for each $p_{i_j}$ in $\hat{p}$, the associated phasers $f_{i_j,1}$, $f_{i_j,2}$, can be ordered, e.g., randomly, or with some other procedure. The letters in $\hat{p}$ can be replaced by the associated ordered phaser pairs, or balanced phasers, resulting in a word $\hat{f}=f_{k_0}f_{k_1}\ldots f_{k_{N-1}}$ of length N on the alphabet F. From step 1008, flow diagram 1000 can continue with step 1012.

In step 1012, for each $f_k$ in $\hat{f}$, $T_k$ can be set equal to $$T_k^{(i)} = \frac{1}{f_{null}}(f_k + n_k).$$

From step 1012, flow diagram 1000 can continue with step 1014.

In step 1014, the $i^{th}$ time-hopping code $C_i=(T_k^{(i)}; 0\leq k\leq N-1)$ can be stored to a storage device 1022 such as, e.g., a disk. From step 1014, flow diagram 1000 can continue with step 1016.

In step 1016, the counter i can be incremented. From step 1016, flow diagram 1000 can continue with step 1018.

In step 1018, if i>M, then flow diagram 1000 can stop processing by continuing immediately with step 1020 which can end flow diagram 1000. Otherwise, flow diagram 1000 can continue with step 1006, which can proceed to repeat steps 1006 through 1018.

Random Phasers Algorithm

Figure 11:
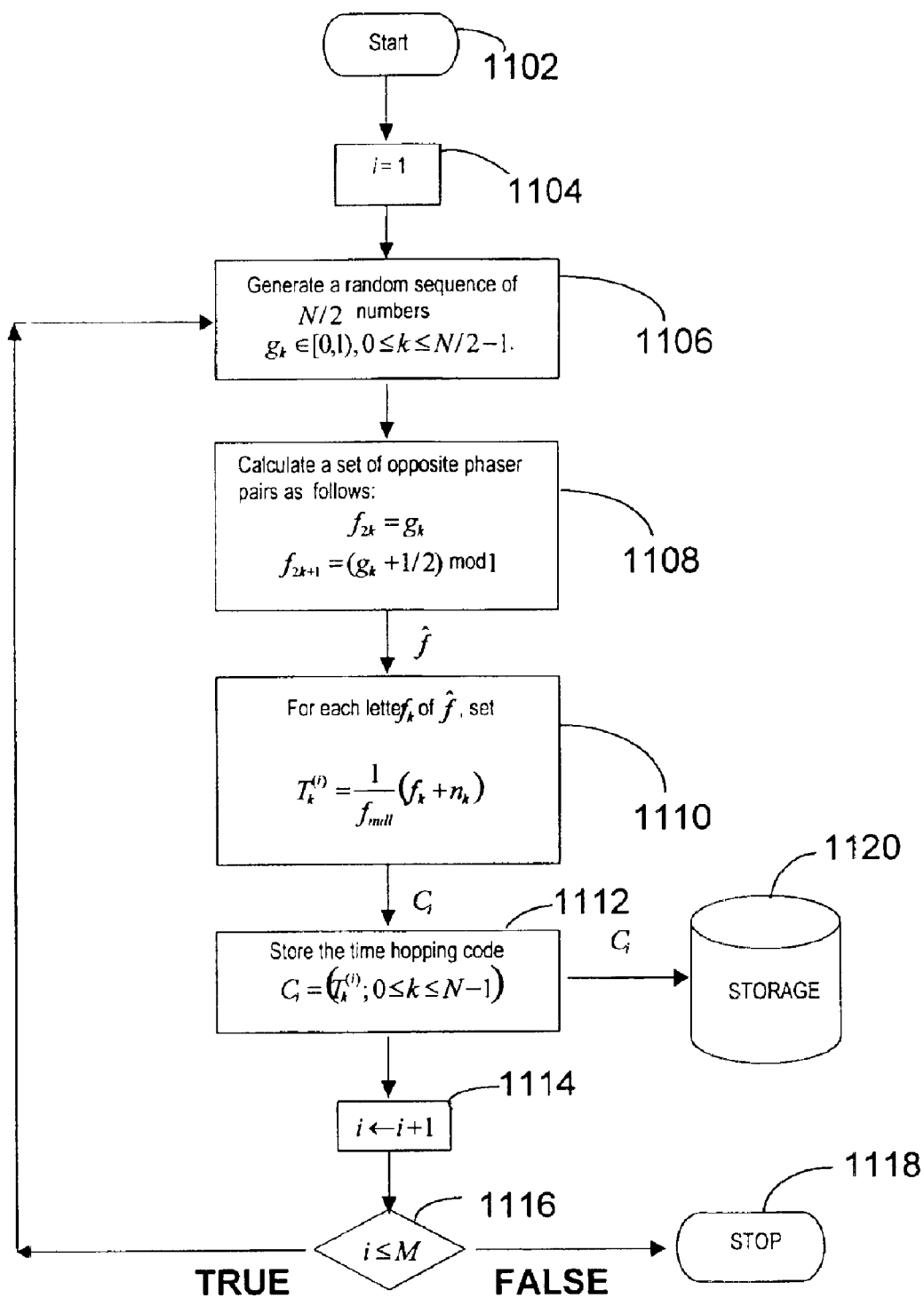
FIG. 11 depicts a flow diagram of a random phasers algorithm used for positioning pulses according to the present invention.

FIG. 11 depicts an exemplary embodiment of a flow diagram 1100 illustrating a random phasers algorithm that does not need any predetermined phasers for input, in contrast to the flow diagram illustrated in FIG. 10. The flow diagram 1100 of FIG. 11 in an exemplary embodiment can generate opposite phaser pairs randomly, and can use these opposite phaser pairs to generate the pseudo-random notched code families.

Inputs can include:

N—time-hopping code length (number of pulses), an even positive integer number;
M—number of time-hopping codes, a positive integer number;
$f_{null}$—frequency to null, a positive real number; and
$n(\bullet)$—one or more increasing maps from $\{0, 1, \ldots, N-1\}$ into the positive integers.

Outputs can include:

$C_i=(T_k^{(i)}; 0\leq k\leq N-1), 1\leq i\leq M$—a family of time-hopping codes, each with a spectral notch at $f_{null}$. There can be M codes in the family, each of length N.

Processing Flow for Random Phasers Algorithm

FIG. 11 depicts an exemplary embodiment of a flow diagram 1100. Flow diagram 1100 can begin with step 1102 and can continue immediately with step 1104.

In step 1104, a counter i can be initialized, by setting i=1. From step 1104, flow diagram 1100 can continue with step 1106.

In step 1106, a random sequence of N/2 numbers $g_k\in[0,1)$, $0\leq k\leq N/2-1$, can be generated. From step 1106, flow diagram 1100 can continue with step 1108.

In step 1108, a set of opposite phaser pairs, or balanced phasers, can be calculated as follows: for $0\leq k\leq N/2-1$, setting $f_{2k}=g_k$; and $f_{2k+1}=(g_k+\frac{1}{2})\bmod 1$. From step 1108, flow diagram 1100 can continue with step 1110.

In step 1110, for each $f_k$, $0\leq k\leq N-1$, a $T_k$ can be set equal to $$T_k^{(i)} = \frac{1}{f_{null}}(f_k + n_k).$$

From step 1110, flow diagram 1100 can continue with step 1112.

In step 1112, the $i^{th}$ time-hopping code $C_i=(T_k^{(i)}; 0\leq k\leq N-1)$ can be stored to a storage device 1120 such as, e.g., a disk. From step 1112, flow diagram 1100 can continue with step 1114.

In step 1114, the counter i can be incremented. From step 1104, flow diagram 1114 can continue with step 1116.

In step 1116, it can be determined whether i>M, and if so, flow diagram 1100 can continue immediately with step 1118, which can be the end of flow diagram 1100 stopping processing. Otherwise, flow diagram can continue with step 1106, which can proceed to repeat steps 1106 through 1116.

Spectrum Notching with Combinational Coding

In another exemplary embodiment of the present invention, the present invention can be combined with any of a number of other coding methods to obtain desired correlation properties and/or spectral properties. Suppose, e.g., that a family of time-hopping codes is known to possess ideal cross-correlation properties, and it is desirable to add a spectral notch at a particular frequency. Also suppose, e.g., that these time-hopping codes specify time slots within which pulses are to be positioned, but do not specify precise time positions within the slots. Given that the width (in time) of the slots used in a given time layout is generally a design issue, slots may be used that are wider than the width of pulses, thereby providing some freedom in the exact positioning of pulses within slots. The present invention takes advantage of this concept of freedom of positioning within slots to produce spectral notches.

According to an exemplary THC it can be desired that pulses be transmitted in each of several time intervals. A time-hopping code having desired correlation properties can subdivide time intervals into a number of frames 602 and slots 604, as shown in an exemplary embodiment of FIG. 6. In an exemplary embodiment, there can be frame boundaries and one pulse can occur per frame, and each frame can include 4 slots. To guarantee desired correlation properties, the pulses are placed in the slots 604a, 604b, 604c, and 604d of each respective frame 602 as dictated by the time-hopping code. Furthermore, if the width of the slots 604a, 604b, 604c, and 604d is sufficiently wide, a degree of freedom in which to position pulses may be used by the present invention to create a notch.

Various numerical code generation techniques are described further below. For example, algebraic codes with desirable correlation properties can be combined with the notched spectrum code of the present invention.

Figure 6A:
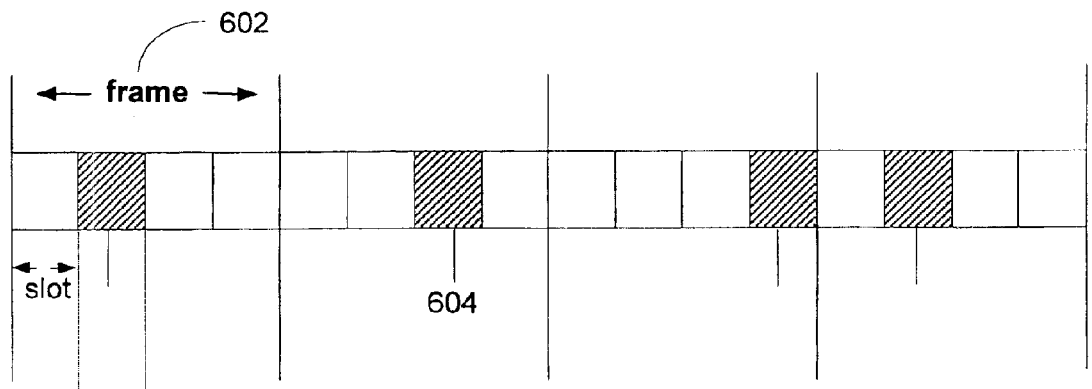
FIG. 6A illustrates an exemplary diagram of repetitive timeframes divided into timeslots.
Figure 6B:
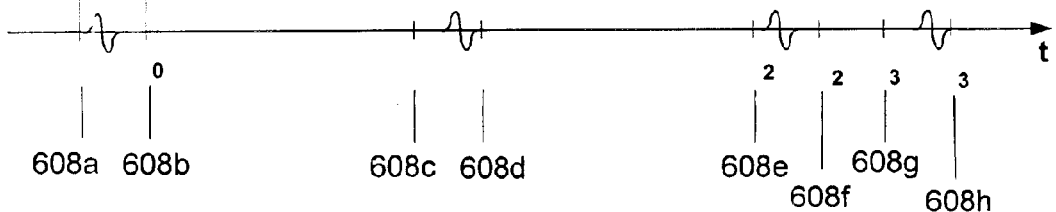
FIG. 6B illustrates frequency ranges (a,b) within which a spectral notch can be formed according to the present invention.

FIG. 6A includes time axis 606 defining time regions ($a_0$ 608a to $b_0$ 608b), ($a_1$ 608c to $b_1$ 608d), ($a_2$ 608e to $b_2$ 608f), ($a_3$ 608g to $b_3$ 608h), or ($a_k$ to $b_k$) corresponding to time slots 604a–d within which the pulse positioned using time-hopping code $T_k$ must lie in order to guarantee the desired correlation properties. Accordingly, assuming the range ($a_k$ to $b_k$) comes from a desired THC codes, then using the Equation 8 from above, the desired result of a spectral notch at a desired frequency can follow according to the present invention if $a_k \leq T_k \leq b_k$. Inserting $T_k$ from Equation 8 in the inequality, Equation 9 results.

$$a_k \leq (1/f_{null})(f_k+n_k) \leq b_k, \text{ where } n_k \text{ is any integer.} \quad \text{Equation 9.}$$

If the inequality can be solved, then a spectral notch of the present invention can be obtained. It may not always be possible to solve the inequality. Suppose that the phasers $f_k$'s are fixed. Multiplying all sides of the inequality by $f_{null}$ and subtracting results in Equation 10.

$$f_{null}a_k - f_k \leq n_k \leq f_{null}b_k - f_k, \text{ where } n_k \text{ is any integer.} \quad \text{Equation 10.}$$

Hopefully it is possible to solve for an integer $n_k$. The left side of the inequality of Equation 10 will certainly be smaller than the right side. If there is an integer difference between the left and right side of the inequality, then $n_k$ can be solved according to the present invention. An integer will exist according to the present invention if the difference between the left side and the right side of Equation 10 is at least one.

Thus, according to the present invention, the Equation 10 is solvable if $f_{null}(b_k - a_k) \geq 1$, for $k=0, 1 \ldots, N-1$. Since $b_k - a_k$ is often a constant, referred to as the slot width, δ, if it works for one, it probably works for all. Thus, various combinations of codes can be combined advantageously according to the present invention to obtain notched spectrums in combination with desirable correlation or spectral properties of other codes. As mentioned, δ is the slot width. If the product of frequency $f_{null}$ and δ are greater than or equal to 1 then Equation 10 can be solved, and the code can be notched. If not, then one may still be able to notch the code, but it depends on the particularities of the code and the frequency one is trying to notch. This is an example of combination coding, combining, e.g., one or more time-hopping codes with spectrum notching according to the present invention. Various numerical code generation techniques are described further below and also in the related applications, the contents of which have been incorporated by reference.

Numerical Code Generation

After a time period layout and a code mapping approach have been established as described, for example in "A METHOD AND APPARATUS FOR POSITIONING PULSES IN TIME," to Richards, et al., Ser. No. 09/592,248, of common assignee to the present invention, the contents of which are incorporated herein by reference in their entirety, a time-hopping code can be generated using a numerical code generation technique. For certain pulse transmission system applications such as communications, the autocorrelation and cross-correlation properties of a pulse train are preferably within certain limits to ensure proper signal locking and channelization. In such cases, a code can be generated using another code such as, e.g., a quadratic congruential, hyperbolic congruential, linear congruential, a Welch-Costas array, a Golomb-Costas array, a pseudorandom, a chaotic, an optimal Golomb Ruler, or other such numerical code generation technique designed to generate codes guaranteed to have, e.g., specific correlation properties.

The reader is directed to related U.S. patent application Ser. No. 09/638,046 entitled "A METHOD AND APPARATUS FOR APPLYING CODES HAVING PREDEFINED PROPERTIES," filed Jun. 12, 2000 as a continuation-in-part application of pending U.S. patent application Ser. No. 09/591,690, relating to combinational codes, the contents of which is incorporated herein by reference in its entirety.

FIG. 6C depicts an exemplary embodiment of a nested combination of codes. With the nested combination of codes, a first code 612 having optimal correlation properties can be used to specify subcomponents 616 within a value range layout (e.g., subcomponents 616 within frames 614) within which pulses 618 are to be placed. A second code 620 having optimal spectral properties can be used to specify the exact positions 622 of pulses 618 within the subcomponents 616 specified by the first code 612.

Specifically, in FIG. 6C, a value range time layout is shown consisting of seven frames 614 that are subdivided into seven subcomponents 616 containing seventeen discreet time values 622 each. The subcomponents 616 within each frame 614 are numbered 0 through 6 and the seventeen discreet values 622 within each subcomponent are numbered 0 through 16.

First code 612, {0, 2, 1, 4, 4, 1, 2}, which can be generated using the quadratic congruential code generation technique, can be mapped to subcomponents 616 within each frame 614. The seven subcomponents 616 to which the elements of the first code 612 are mapped are shown enlarged.

Second code 620, {7, 5, 14, 3, 1, 10, 16}, which is generated using, e.g., a pseudorandom code generation technique, is mapped to discrete values 1012 within the subcomponents 616 specified by the first code 612.

Combination Coding Methodology

The mappings n and δ come from some other coding methodology. For instance, the mapping n can be determined from an algebraic code design such as, e.g., Quadratic Congruential, or Hyperbolic, that can minimize cross-correlation properties between different codes in the same family.

Note that the combination coding methodology can provide the ability to incorporate channelization and spectral design requirements into a single code family.

Combination Coding Algorithm

The combination coding algorithm can take as one of its inputs another THC code. The combination coding algorithm can generate balanced phasers, or opposite phaser pairs randomly, and can use these to produce a notched code whose timing is constrained by the input code. Because the timing characteristics of the notched code output can be close to those of the input code, the correlation and channelization properties of the notched code output can be similar to those of the input code. Thus, by running the combination coding algorithm on all the codes in a coding family with desired correlation or spectral properties, a notched coding family with desirable correlation or spectral properties can be produced.

Inputs can include:

N—time-hopping code length (number of pulses), a positive integer;
$T_C$—time-hopping code period, a positive real number;
$f_{null}$—frequency to null, a positive real number;
dC—input code, given as an increasing array of integers representing pulse location slots, dC can have N pulses in it, where the input code can include another code such as, e.g., a quadratic congruential, a hyperbolic congruential, or other codes; and
m—total number of available positioning slots for dC.

Outputs can include:
C=($T_k$; $0 \leq k \leq N-1$)—output C is a time-hopping code with a notch in its spectrum at $f_{null}$, and with correlation properties similar to input code dC. The time-hopping code C has period T.

Processing Flow for Combination Coding Algorithm

Figure 12:
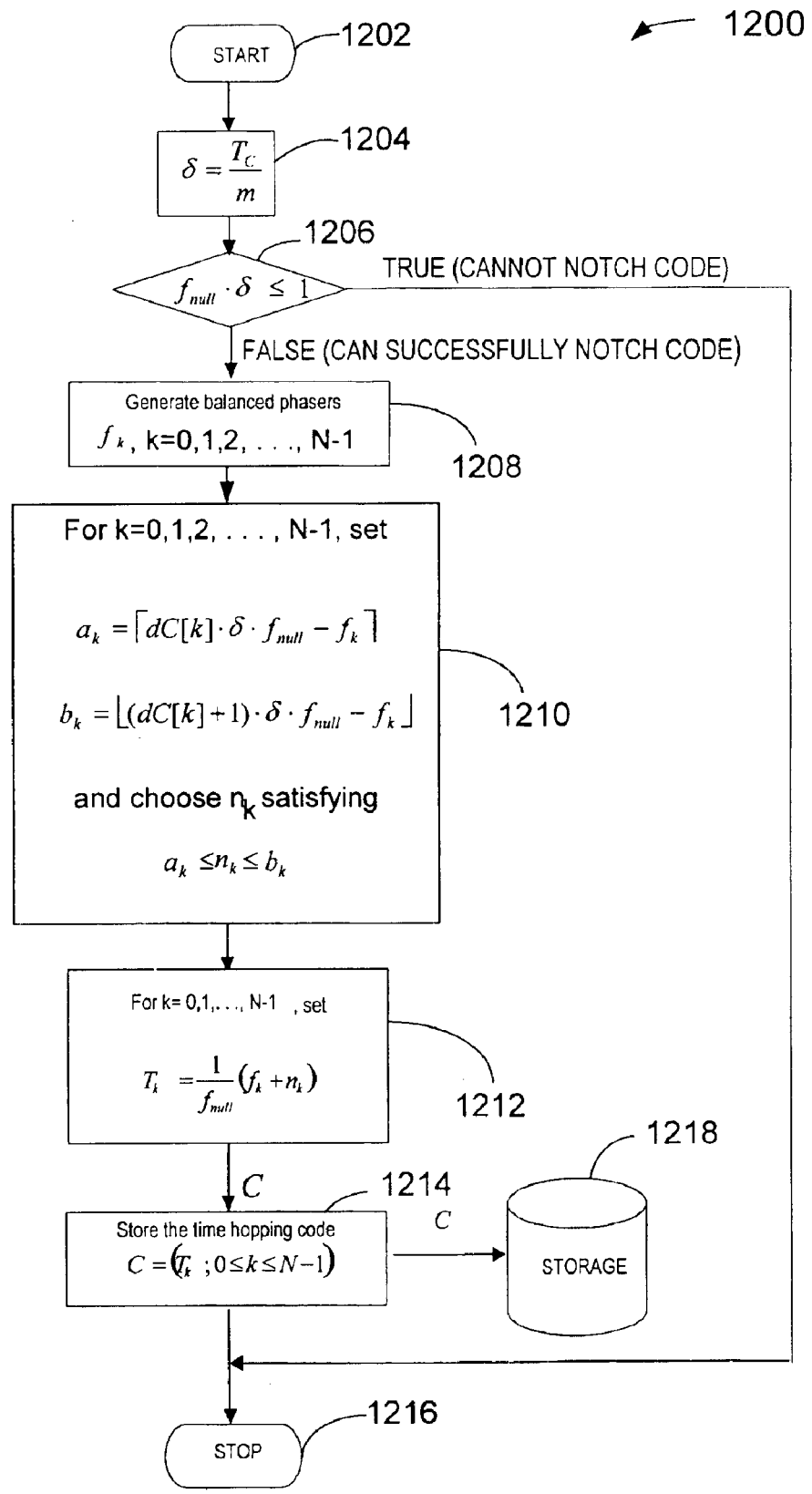
FIG. 12 depicts a flow diagram of a combination coding algorithm used for positioning pulses according to the present invention.

FIG. 12 depicts an exemplary embodiment of a flow diagram 1200. Flow diagram 1200 can begin with step 1202 and can continue immediately with step 1204.

In step 1204, δ, a time-width of the positioning slots specified by the input code dC, can be calculated by setting $$\delta = \frac{T_C}{M}.$$

From step 1204, flow diagram 1200 can continue with step 1206.

In step 1206, if $f_{null} \cdot \delta \leq 1$, then an error code can be returned, (i.e., the input code dC cannot be notched at the frequency $f_{null}$), and flow diagram 1200 can immediately end with step 1216. From step 1206, flow diagram 1200 can continue with step 1208.

In step 1208, a sequence $f_k$, $0 \leq k \leq N-1$ of balanced phasers can be generated, e.g., randomly (see, for example, steps 1106 and 1108 of FIG. 11). From step 1208, flow diagram 1200 can continue with step 1210.

In step 1210, for k from 0 to N−1, $a_k$ and $b_k$ can be calculated by setting $a_k = \rceil dC[k] \cdot \delta \cdot f_{null} - f_k \lceil$; $b_k = \lfloor (dC[k]+1) \cdot \delta \cdot f_{null} - f_k \rfloor$; and an $n_k$ can be chosen such that $a_k \leq n_k \leq b_k$. From step 1210, flow diagram 1200 can continue with step 1212.

In step 1212, for each k from 0 to N−1, a $T_k$ can be calculated by setting $$T_k = \frac{1}{f_{null}}(f_k + n_k).$$

From step 1212, flow diagram 1200 can continue with step 1214.

In step 1214, the time-hopping code C=($T_k$; $0 \leq k \leq N-1$) can be stored in a storage device 1218 such as, e.g., a disk. From step 1214, flow diagram 1200 can continue immediately with step 1216 which can immediately end.

Combination Coding with Non-allowable Regions

Another combination coding technique for notched codes can avoid placing pulses in specific non-allowable regions. For further discussion of non-allowable regions, please refer to related U.S. patent application Ser. No. 09/637,878 entitled "A METHOD AND APPARATUS FOR POSITIONING PULSES USING A LAYOUT HAVING NON-ALLOWABLE REGIONS," filed Aug. 15, 2000 as a continuation-in-part application of pending U.S. patent application Ser. No. 09/592,248, the contents of which are incorporated herein by reference in their entirety. In an exemplary embodiment of the present invention, an algorithm can take as input a specification of ranges [$B^{NA}_j$, $E^{NA}_j$] of non-allowable regions, and can produce code elements of the form $T_k$, such that $$T_k = \frac{1}{f_{null}}(f_k + n_k);$$

for k=0, 1, 2, ... N−1, where $f_k$, k=0, 1, 2, ... N−1, is a set of balanced phasers and the $n_k$'s are chosen so that $T_k$ does not fall in the range [$B^{NA}_j$, $E^{NA}_j$] for all k and j.

Exemplary Transceiver Implementation

Transmitter

An exemplary embodiment of an impulse radio transmitter 802 of an impulse radio communication system having one subcarrier channel will now be described with reference to FIG. 8.

The transmitter 802 comprises a time base 804 that generates a periodic timing signal 807. The time base 804 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 807 is supplied to a precision timing generator 808.

The precision timing generator 808 supplies synchronizing signals 810 to the code source 812 and utilizes the code source output 814 together with an internally generated subcarrier signal (which is optional) and an information signal 817 to generate a modulated, coded timing signal 818.

The code source 812 can include a storage device such as a random access memory (RAM), read only memory (ROM), or the like, for storing suitable time-hopping codes and for outputting the time-hopping codes as a code signal 814. Alternatively, maximum length shift registers or other computational means can be used to generate the time-hopping codes.

An information source 820 supplies the information signal 817 to the precision timing generator 808. The information signal 817 can be any type of intelligence, including digital bits representing voice, data, imagery, or the like, analog signals, or complex signals.

A pulse generator 822 uses the modulated, coded timing signal 818 as a trigger to generate output pulses. The output pulses are sent to a transmit antenna 824 via a transmission line 827 coupled thereto. The output pulses are converted into propagating electromagnetic pulses by the transmit antenna 824. In the present embodiment, the electromagnetic pulses are called the emitted signal, and propagate to an impulse radio receiver 902, such as shown in FIG. 9, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 902 (hereinafter called the receiver) for the impulse radio communication system is now described with reference to FIG. 9. More specifically, the system illustrated in FIG. 9 is for reception of digital data where one or more pulses are transmitted for each data bit.

The receiver 902 comprises a receive antenna 904 for receiving a propagated impulse radio signal 907. A received signal 908 from the receive antenna 904 is coupled to a cross correlator or sampler 910 to produce a baseband output 912. The cross correlator or sampler 910 includes multiply and integrate functions together with any necessary filters to optimize signal to noise ratio.

The receiver 902 also includes a precision timing generator 914, which receives a periodic timing signal 917 from a receiver time base 918. This time base 918 is adjustable and controllable in time, frequency, or phase, as required by the lock loop in order to lock on the received signal 908. The precision timing generator 914 provides synchronizing signals 920 to the code source 922 and receives a code control signal 924 from the code source 922. The precision timing generator 914 utilizes the periodic timing signal 917 and code control signal 924 to produce a coded timing signal 927. The template generator 928 is triggered by this coded timing signal 927 and produces a train of template signal pulses 930 ideally having waveforms substantially equivalent to each pulse of the received signal 908. The code for receiving a given signal is the same code utilized by the originating transmitter 802 to generate the propagated signal 907. Thus, the timing of the template pulse train 930 matches the timing of the received signal pulse train 908, allowing the received signal 908 to be synchronously sampled in the correlator 910. The correlator 910 ideally comprises a multiplier followed by a short-term integrator to sum the multiplier product over the pulse interval.

Further examples and details of correlation and sampling processes can be found in commonly owned U.S. Pat. Nos. 4,641,317, 4,743,906, 4,813,057, and 4,979,186, which are incorporated herein by reference in their entirety, and commonly owned and co-pending U.S. patent application Ser. No. 09/356,384, filed Jul. 16, 1999, entitled "Baseband Signal Converter Device for a Wideband Impulse Radio Receiver," which is incorporated herein by reference in its entirety.

The output of the correlator 910, also called a baseband signal 912, is coupled to a subcarrier demodulator 932, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 932 is then filtered or integrated in a pulse summation stage 934. The pulse summation stage produces an output representative of the sum of a number of pulse signals comprising a single data bit. The output of the pulse summation stage 934 is then compared with a nominal zero (or reference) signal output in a detector stage 938 to determine an output signal 939 representing an estimate of the original information signal 817.

The baseband signal 912 is also input to a lowpass filter 942 (also referred to as lock loop filter 942). A control loop comprising the lowpass filter 942, time base 918, precision timing generator 914, template generator 928, and correlator 910 is used to generate a filtered error signal 944. The filtered error signal 844 provides adjustments to the adjustable time base 918 to time position the periodic timing signal 927 in relation to the position of the received signal 908.

In a transceiver embodiment, substantial economy can be achieved by sharing part or all of several of the functions of the transmitter 802 and receiver 902. Some of these include the time base 918, precision timing generator 914, code source 922, antenna 904, and the like.

While various exemplary embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What claimed is:

1. A method for positioning pulses in time, comprising:

(a) positioning pulses within a specified time layout in accordance with one or more codes to produce a pulse train having a predefined spectral characteristic,
   wherein a difference in time position between adjacent pulses of said pulses positioned to produce said predetermined spectral characteristic differs from another difference in time position between other adjacent pulses of said pulses positioned to produce said predetermined spectral characteristic.

2. The method according to claim 1, further comprising (b) shaping a code spectrum in accordance with a spectral template such that a predefined code characteristic is preserved.

3. The method according to claim 2, wherein said predefined code characteristic comprises a correlation property.

4. The method according to claim 3, wherein said correlation property comprises a cross-correlation property.

5. The method according to claim 3, wherein said correlation property comprises an auto-correlation property.

6. The method according to claim 2, wherein said predefined code characteristic comprises a spectral property.

7. The method according to claim 2, wherein said code spectrum is minimized.

8. The method according to claim 7, wherein a difference between said code spectrum and said spectral template is minimized.

9. The method according to claim 8, wherein said difference is a weighted difference.

10. The method according to claim 2, wherein said spectral template includes a spectral notch defined by a notch frequency.

11. The method according to claim 10, wherein said notch frequency is a predefined frequency $f_{null}$ and wherein said step (b) comprises:

(1) initializing a counter i;
   (2) forming a random word p of length N/2 from the alphabet F; (3) ordering, for each $P_i$ in said random word p, one or more associated phasers $f_i$, resulting in a set of balanced phasers;
   (4) replacing letters in said random word p by said set of balanced phasers resulting in a word f of length N from the alphabet F,
   (5) calculating a time-hopping code $C_i$ of length N with a spectral notch at the frequency $f_{null}$, including calculating $T_k^{(i)}$ wherein $T_k^{(i)}$ is equal to $(1/f_{null})(f_k+n_k)$;
   (6) storing said time-hopping code $C_i$;
   (7) incrementing said counter i; and
   (8) determining if said counter i is greater than M, if so then ending, and if not then repeating said steps (2)–(8).

12. The method of claim 11, wherein said step (3) comprises ordering randomly.

13. The method of claim 1, wherein said one or more codes comprises at least one of:
a hyperbolic congruential code;
a quadratic congruential code;
a linear congruential code;
a Welch-Costas array code;
a Golomb-Costas array code;
a pseudorandom code;
a chaotic code; and
an optimal Golomb Ruler code.

14. An impulse transmission system configured to generate a spectral notch at a predefined frequency $f_{null}$, the system comprising:
a transmitter configured to transmit a pulse train,
wherein said transmitter is operative to position pulses within a specified time layout in accordance with one or more codes to produce said pulse train having a predefined spectral characteristic,
wherein a difference in time position between adjacent pulses of said pulses positioned to produce said predetermined spectral characteristic differs from another difference in time position between other adjacent pulses of said pulses positioned to produce said predetermined spectral characteristic.

15. The system according to claim 14, wherein said transmitter is operative to shape a code spectrum in accordance with a spectral template such that a predefined code characteristic is preserved.

16. The system according to claim 14, wherein said transmitter is an ultra wideband (UWB) transmitter.

17. A system having a transceiver configured to avoid interfering with a narrow band system, the system comprising:
a transceiver configured to transmit and receive a pulse train that avoids interfering with a narrow band system,
wherein said transceiver is operative to position pulses within a specified time layout in accordance with one or more codes to produce said pulse train having a predefined spectral characteristic,
wherein a difference in time position between adjacent pulses of said pulses positioned to produce said predetermined spectral characteristic differs from another difference in time position between other adjacent pulses of said pulses positioned to produce said predetermined spectral characteristic.

18. The system according to claim 17, wherein said transceiver is operative to shape a code spectrum in accordance with a spectral template such that a predefined code characteristic is preserved.

19. The system according to claim 17, wherein said transceiver is an ultra wideband (UWB) transceiver.

20. A system having a receiver configured to reject interference from a narrow band system, the system comprising:
a receiver configured to receive a pulse train and to reject interference from a narrow band system at a frequency $f_{null}$ corresponding to a frequency of the interference of the narrow band system to be rejected,
wherein said receiver is operative to position pulses within a specified time layout in accordance with one or more codes to produce said pulse train having a predefined spectral characteristic,
wherein a difference in time position between adjacent pulses of said pulses positioned to produce said predetermined spectral characteristic differs from another difference in time position between other adjacent pulses of said pulses positioned to produce said predetermined spectral characteristic.

21. The system according to claim 20, wherein said receiver is operative to shape a code spectrum in accordance with a spectral template such that a predefined code characteristic is preserved.

22. The system according to claim 20, wherein said receiver is an ultra wideband.(UWB) receiver.

23. A radar system operative to avoid interfering with a narrow band system, the system comprising:
a radar transmitter operative to avoid transmitting at a predefined frequency fnull corresponding to a frequency of the narrow band system to be avoided, and configured to transmit a pulse train,
wherein said radar transmitter is operative to position pulses within a specified time layout in accordance with one or more codes to produce said pulse train having a predefined spectral characteristic,
wherein a difference in time position between adjacent pulses of said pulses positioned to produce said predetermined spectral characteristic differs from another difference in time position between other adjacent pulses of said pulses positioned to produce said predetermined spectral characteristic.

24. The system according to claim 23, wherein said radar transmitter is operative to shape a code spectrum in accordance with a spectral template such that a predefined code characteristic is preserved.

25. The system according to claim 23, wherein said radar transmitter is an ultra wideband (UWB) radar transmitter.

26. The radar system according to claim 23, wherein said predefined frequency $f_{null}$ corresponds to a personal communications systems (PCS) frequency band.

27. The radar system according to claim 26, wherein said predefined frequency $f_{null}$ corresponds to a 1.9 MHz frequency band.

28. The radar system according to claim 23, wherein said predefined frequency $f_{null}$ corresponds a global positioning system (GPS) frequency band.

29. The radar system according to claim 26, wherein said predefined frequency $f_{null}$ corresponds to at least one of a 1575.42 MHz, and a 1227.60 MHz frequency bands.

30. The radar system according to claim 23, wherein said predefined frequency $f_{null}$ corresponds to an industrial scientific medical (ISM) band.

31. The radar system according to claim 30, wherein said predefined frequency $f_{null}$ corresponds to at least one of a 902–928 MHz, a 2.4–2.483 GHz, and a 5.725–5.875 GHz frequency bands.

32. A method of generating a time-hopping code having a spectral notch at a frequency $f_{null}$, the method comprising:
(a) defining the frequency $f_{null}$
(b) determining a code length N; and
(c) calculating a time-hopping code of length N with a spectral notch at the frequency $f_{null}$
wherein a difference in time position between adjacent pulses of said pulses positioned to produce said predetermined spectral characteristic differs from another difference in time position between other adjacent pulses of said pulses positioned to produce said predetermined spectral characteristic.

33. The method according to claim 32, wherein said step (c) comprises:

(1) calculating a set of associated ordered phasers $f_k$; and (2) calculating a time-hopping code $T_k$ wherein $T_k$ is equal to $(1/f_{null})(f_k+n_k)$, and wherein $n_k$ is an arbitrary integer.

34. The method according to claim 33, wherein said step (2) comprises:

(A) choosing $n_k$ so as to satisfy a constraint.

35. The method according to claim 34, wherein said constraint comprises at least one of:

maintaining an average pulse repetition frequency (PRF);

maintaining at least one of low cross-correlation and auto-correlation properties of the time-hopping code; and minimizing spectral peaking of the code spectrum.

36. The method according to claim 33, wherein said step (1) comprises:

(A) constructing a number of opposite phaser pairs $(f_k, f_{k+1})$ wherein for each pair a first frequency $f_k$ is chosen randomly and a second frequency $f_{k+1}$ is chosen to be 180 degrees opposite the first frequency $f_k$.

37. The method according to claim 33, wherein said step (1) comprises:

(A) arranging N phasers evenly around a unit circle such that the distance between adjacent phasers is 2Π radians.

38. The method according to claim 33, wherein said step (1) comprises:

(A) constructing a first subset of phaser pairs $(f_k, f_{k+1})$ wherein for each pair a first frequency $f_k$ is chosen randomly and a second frequency $f_{k+1}$ is chosen to be 180 degrees opposite the first frequency $f_k$; and (B) arranging a second subset of phasers evenly around a unit circle such that the distances between any pair of adjacent phasers are all equal.

39. The method of claim 32, further comprising:

(d) using another code-generation technique.

40. The method of claim 39, wherein said another code-generation technique comprises at least one of:

a code producing an auto-correlation property; and a code producing a cross-correlation property.

41. The method of claim 39, wherein said another code-generation technique comprises at least one of:

a hyperbolic congruential code;

a quadratic congruential code;

a linear congruential code;

a Welch-Costas array code;

a Golomb-Costas array code;

a pseudorandom code;

a chaotic code; and an optimal Golomb Ruler code.

42. A method for positioning pulses in time, comprising:

positioning pulses within a specified time layout according to one or more codes to produce a pulse train having one or more predefined spectral characteristics, wherein a difference in time position between adjacent pulses of said pulses positioned to produce said predetermined spectral characteristic differs from another difference in time position between other adjacent pulses of said pulses positioned to produce said predetermined spectral characteristic.

43. The method of claim 42, further comprising shaping a code spectrum spectral characteristic in accordance with a spectral template at a predefined frequency, $f_{null}$, including preserving a predefined code characteristic.

44. The method of claim 42, wherein said specified time layout comprises a non-allowable region.

* * * * *